(12) United States Patent
Childress et al.

(10) Patent No.: US 9,597,859 B2
(45) Date of Patent: Mar. 21, 2017

(54) SELF-SEALING BLADDERS AND RELATED METHODS

(71) Applicant: The Boeing Company, Huntington Beach, CA (US)

(72) Inventors: James J. Childress, Mercer Island, WA (US); Mark Stewart Wilenski, Mercer Island, WA (US); Michael Patrick Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 14/722,460

(22) Filed: May 27, 2015

(65) Prior Publication Data

US 2016/0347038 A1 Dec. 1, 2016

(51) Int. Cl.
*B64D 37/06* (2006.01)
*B32B 25/04* (2006.01)
*B64D 37/32* (2006.01)

(52) U.S. Cl.
CPC ............ *B32B 25/042* (2013.01); *B64D 37/06* (2013.01); *B64D 37/32* (2013.01); *B32B 2307/762* (2013.01); *B32B 2439/00* (2013.01); *B32B 2605/00* (2013.01); *B32B 2605/18* (2013.01)

(58) Field of Classification Search
CPC ............ B32B 25/042; B32B 2307/762; B32B 2439/00; B32B 2605/00; B32B 2605/18; B64D 37/06; B64D 37/32
USPC .......... 220/4.14, 41.15, 560.02, 560.01, 900; 206/524.3
See application file for complete search history.

(56) References Cited

U.S. PATENT DOCUMENTS

| | | | |
|---|---|---|---|
| 3,509,016 A | | 4/1970 | Underwood et al. |
| 3,563,846 A | * | 2/1971 | Harr ................. B60K 15/03177 220/560.02 |
| 3,654,057 A | * | 4/1972 | Olevitch ................. B32B 15/08 220/560.02 |
| 3,801,425 A | * | 4/1974 | Cook ...................... B29C 73/20 220/560.02 |
| 4,345,698 A | * | 8/1982 | Villemain .............. B64D 37/02 220/560.02 |
| 4,925,057 A | | 5/1990 | Childress et al. |

(Continued)

*Primary Examiner* — King M Chu
(74) *Attorney, Agent, or Firm* — DASCENZO Intellectual Property Law, P.C.

(57) ABSTRACT

A self-sealing bladder may automatically seal a puncture wound formed in a bladder wall thereof, such as due to being perforated by a projectile. Self-sealing bladders may be used in containers, such as fuel tanks, in order to prevent loss of fuel or other fluid from the container. Self-sealing bladders may contain a sealant material contained within one or more localized reservoirs formed within the bladder wall, the sealant material being pressurized within the bladder wall such that a localized reduction in pressure due to a perforation in the bladder wall causes the sealant material to migrate to the perforated site, whereupon the sealant material hardens, thereby sealing the wound. The localized reservoirs may include one or more channels and/or connecting layers extending therefrom and in fluid communication therewith, to facilitate migration of the sealant material away from the localized reservoirs and towards the perforated portion of the bladder wall.

20 Claims, 9 Drawing Sheets

(56) References Cited

U.S. PATENT DOCUMENTS

| | | | | |
|---|---|---|---|---|
| 4,939,878 | A * | 7/1990 | Schuhbauer | E04B 1/0007 220/560.02 |
| 5,018,634 | A * | 5/1991 | Le Touche | B64G 1/402 220/4.12 |
| 6,409,040 | B1 * | 6/2002 | Distelhoff | B60K 15/03177 220/4.14 |
| 7,195,285 | B2 * | 3/2007 | Rodousakis | B64D 37/06 220/23.4 |
| 7,861,884 | B2 | 1/2011 | Childress et al. | |
| 8,039,075 | B2 * | 10/2011 | Malmberg | B02C 17/225 428/44 |
| 8,043,676 | B2 * | 10/2011 | Ohnstad | B60K 15/03177 220/560.02 |
| 8,881,924 | B2 * | 11/2014 | West | B64D 37/08 220/4.14 |
| 8,985,380 | B2 | 3/2015 | Cook | |
| 2010/0327648 | A1 * | 12/2010 | Livengood | B60N 2/58 297/452.61 |
| 2012/0181207 | A1 * | 7/2012 | Cook | B60K 15/03 206/524.3 |
| 2014/0223744 | A1 * | 8/2014 | Childress | B23P 11/00 29/897.2 |

* cited by examiner

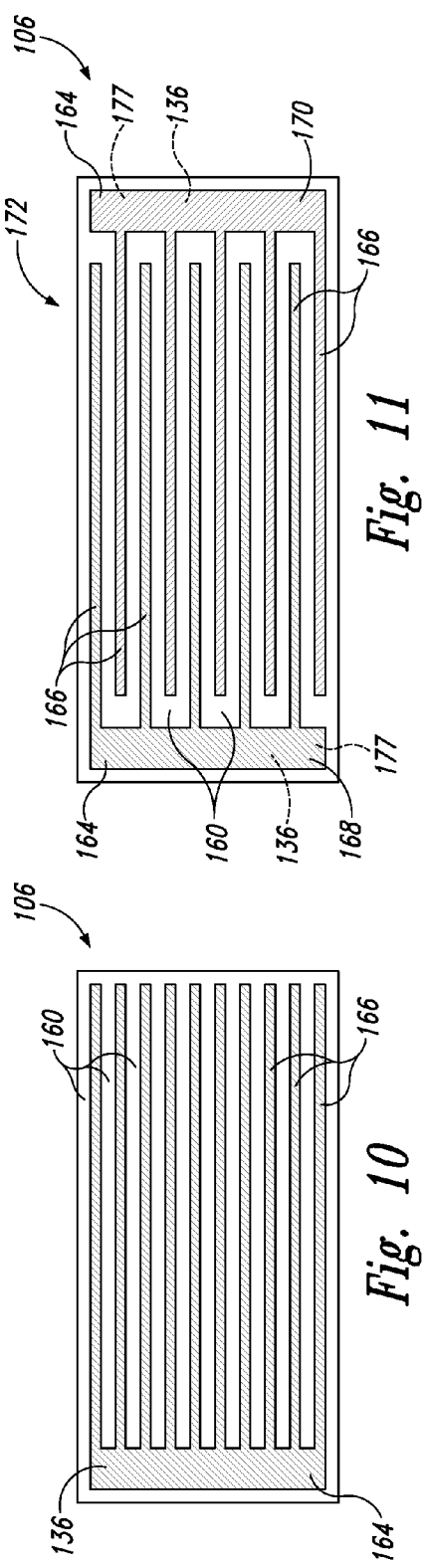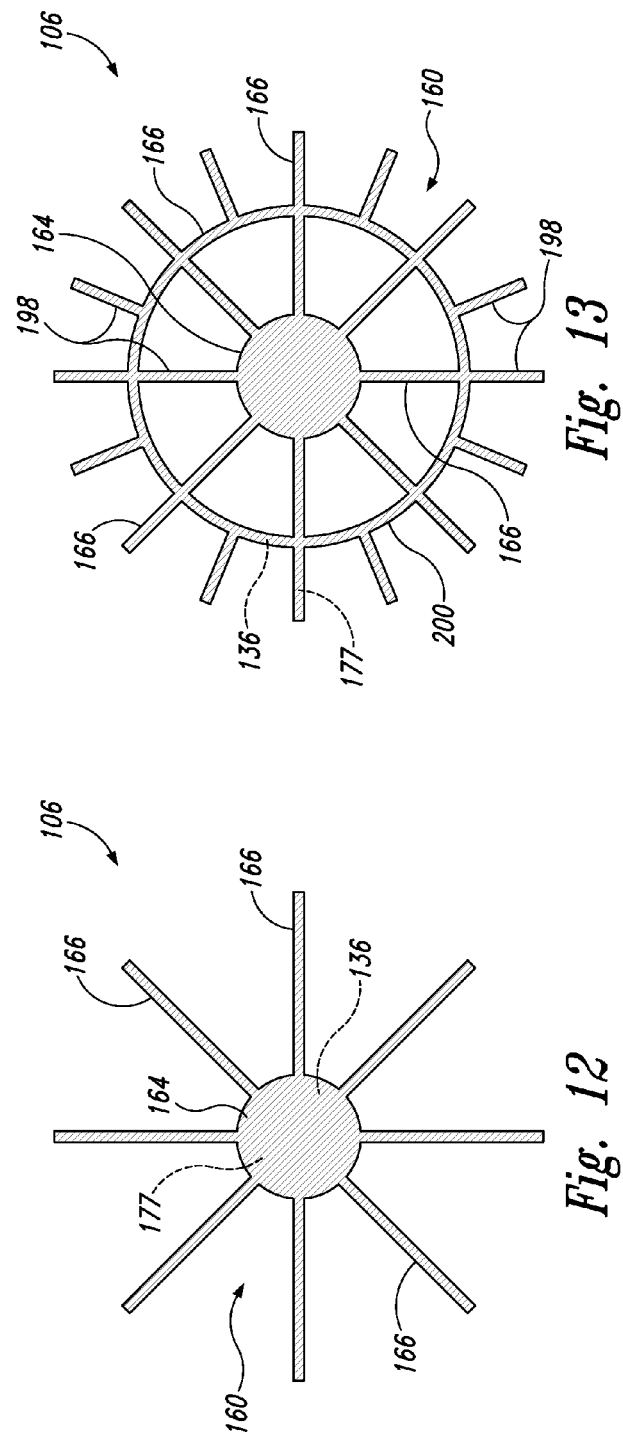

SELF-SEALING BLADDERS AND RELATED METHODS

FIELD

The present disclosure relates to self-sealing bladders and related methods.

BACKGROUND

Vehicles having tanks of liquid (e.g., fuel, oil, etc.) often employ one or more features to protect the tank against damage and/or minimize the impact if damage does occur. A fuel tank that suffers damage, such as a puncture or perforation, may suffer fuel leakage, which can reduce the amount of fuel available to power the vehicle, result in a financial loss of valuable fuel, result in environmental contamination, and/or create a risk of fire. Military vehicles (e.g., military aircraft), may be subject to damage from combat, such as being hit by ballistics, small arms fire, projectile weapons, and/or any other device. Such damage from these or other weapons may result in bullet holes, punctures, tears, piercings, etc. in the vehicle, with those affecting the fuel tank being particularly problematic. Accordingly, many vehicles, military or otherwise, utilize self-sealing fuel tanks to minimize such risks when the fuel tank is hit. Conventional self-sealing fuel tanks use a thick layer of natural rubber in the center of a bladder wall. When the tank and self-sealing bladder are punctured, fuel from the tank interacts with the natural rubber of the bladder, and the fuel causes the rubber to swell to an extent that the hole is effectively sealed, thereby preventing further fuel leakage. However, the natural rubber takes a significant amount of time (e.g., 2 minutes or more) to swell enough (by absorbing the leaking fuel) to seal the penetration, and also is not capable of sealing larger caliber penetrations. Furthermore, conventional self-sealing fuel tank bladders are stiff, heavy, and difficult to install.

SUMMARY

Presently disclosed self-sealing bladders may be used in any container holding a fluid, in order to minimize the effects of damage (e.g., a perforation) thereto. For example, presently disclosed self-sealing bladders may be placed within a fuel tank to automatically seal any punctures suffered by the fuel tank. The seal-sealing effect may be rapid in some examples, may be capable of sealing larger caliber penetrations than are conventional self-sealing bladders, may be lighter and easier to install than conventional self-sealing bladders, and/or may be more flexible than conventional self-sealing bladders. Generally, presently disclosed self-sealing bladders may include a bladder wall with multiple layers, where sealant material is sandwiched in a central bladder area between respective barrier layers and sealant-impermeable layers. The central bladder area may be passively pressurized such that the sealant material is automatically forced to migrate to a damaged (e.g., perforated) area of the bladder due to elastomeric threads configured to keep the bladder wall in a state of compression. Localized, spaced apart reservoirs formed in the bladder wall may be included to distribute the sealant material throughout the bladder wall.

One example of a self-sealing bladder according to the present disclosure may be configured to be positioned inside a container configured for holding a fluid, with the self-sealing bladder positioned between the container and the fluid when the container contains the fluid. The self-sealing bladder may have a non-perforated filled configuration, a non-perforated unfilled configuration, and a perforated configuration, depending on whether a sealant material is present within a bladder wall, and/or depending on whether the bladder wall has been perforated. The bladder wall may be formed of a plurality of layers, including a first barrier layer, a first sealant-impermeable layer, a second sealant-impermeable layer, and/or a second barrier layer. The first barrier layer may include a first inner surface and a first outer surface opposite the first inner surface, wherein the first barrier layer may be substantially impervious to the fluid when the self-sealing bladder is in the non-perforated filled and non-perforated unfilled configurations. The first sealant-impermeable layer may be coupled to the first inner surface of the first barrier layer.

The second barrier layer may include a second inner surface and a second outer surface opposite the second inner surface, and the second barrier layer also may be substantially impervious to the fluid when the self-sealing bladder is in the non-perforated filled and non-perforated unfilled configurations. The second inner surface may be arranged to be facing the first inner surface of the first barrier layer, whereas the first outer surface of the first barrier layer and the second outer surface of the second barrier layer may be oriented facing away from one another. The second sealant-impermeable layer may be coupled to the second inner surface of the second barrier layer and to the first sealant-impermeable layer, such that the first sealant-impermeable layer and the second sealant-impermeable layer may define a central bladder area formed therebetween. The central bladder area may be configured to receive the sealant material, and the central bladder area may have a variable volume depending on the amount of sealant material within the central bladder area.

The self-sealing bladder also may include one or more localized reservoirs formed within the central bladder area and an elastomeric thread coupling the second sealant-impermeable layer to the first sealant-impermeable layer. The elastomeric thread may be configured to couple the second sealant-impermeable layer to the first sealant-impermeable layer such that the elastomeric thread allows for variable, elastic separation of the second sealant-impermeable layer from the first sealant-impermeable layer when the elastomeric thread is under tension. In the perforated configuration, the self-sealing bladder may be configured to, at least partially, automatically seal a perforated portion of the self-sealing bladder, thereby substantially preventing loss of the fluid from the container through the perforated portion.

Related methods also are disclosed. For example one method of fabricating a container configured for holding a fluid, where the container includes an internal space configured to receive the fluid therein, may include providing a self-sealing bladder by coupling a first barrier layer to a first sealant-impermeable layer, coupling a second barrier layer to a second sealant-impermeable layer, coupling the first sealant-impermeable layer to the second sealant-impermeable layer using elastomeric thread, thereby forming a central bladder area defined between the first sealant-impermeable layer and the second sealant-impermeable layer, and/or forming a plurality of localized, spaced-apart reservoirs within the central bladder area. The self-sealing bladder may be positioned inside the container such that the first outer surface of the first barrier layer is adjacent an interior surface of the container and the second barrier layer is interior to the first barrier layer, with the second outer surface of the second barrier layer facing the internal space of the container. Methods may further include inserting a sealant material into the central bladder area between the first sealant-impermeable layer and the second sealant-impermeable layer, such that the sealant material is distributed throughout substantially the entire central bladder area. In this manner, a container may be provided having a self-sealing bladder according to the present disclosure, that may be configured to automatically prevent or reduce loss of fluid from the container in the event that the container wall is breached or perforated.

BRIEF DESCRIPTION OF THE DRAWINGS

FIG. 10 is a schematic, elevation view representation of an illustrative, non-exclusive example of a portion of a central bladder area having a localized reservoir with a plurality of channels in fluid communication therewith, according to the present disclosure.

FIG. 11 is a schematic, elevation view representation of an illustrative, non-exclusive example of a portion of a central bladder area having two localized reservoirs, each with a respective plurality of channels in fluid communication therewith, according to the present disclosure.

FIG. 12 is a schematic, elevation view representation of an illustrative, non-exclusive example of a localized reservoir and associated channels that may be included in a central bladder area of a self-sealing bladder according to the present disclosure.

FIG. 13 is a schematic, elevation view representation of an illustrative, non-exclusive example of a localized reservoir and associated channels that may be included in a central bladder area of a self-sealing bladder according to the present disclosure.

DESCRIPTION

Figure 1:
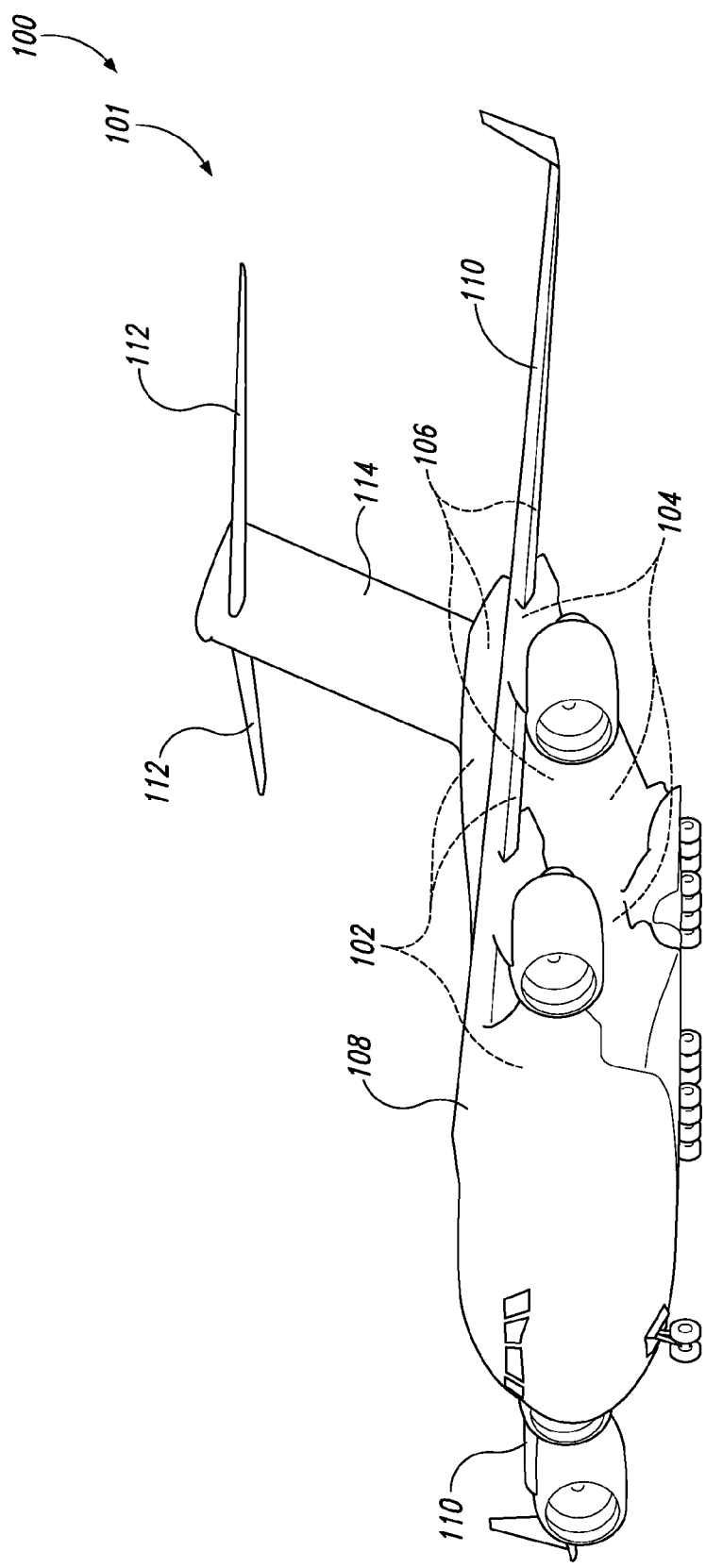
FIG. 1 is a perspective view of an illustrative, non-exclusive example of an aircraft that may include one or more containers and self-sealing bladders according to the present disclosure.

Self-sealing bladders and related methods are disclosed herein. Such presently disclosed self-sealing bladders and related methods may be used to reduce loss of a fluid from a container when the container is perforated, such as by being used in a fuel tank of an aircraft or other large apparatus. Presently disclosed self-sealing bladders may provide faster sealing of punctures to the bladder walls compared to prior art self-sealing tanks, may be able to seal larger wounds than prior art self-sealing tanks, may be easier to install than prior art devices, may be more flexible than prior art devices, may be lighter than prior art devices, may use less sealant than prior art devices, may have a thinner bladder wall than prior art devices, and/or may enable the cavity or container in which the self-sealing bladder is placed to hold more fuel than if a prior art device is used. In some examples, such self-sealing bladders may be included in an apparatus, such as apparatus 100, as schematically Illustrated in FIG. 1. For example, apparatus 100 may include one or more cavities 102 or containers 102 configured to hold a fluid, such as one or more fuel tanks 104, that may include one or more self-sealing bladders 106 according to the present disclosure.

Apparatus 100 may be provided in the form of a passenger aircraft 101; however, other apparatuses 100 are within the scope of the present disclosure, and the present disclosure is not limited to aircraft and aircraft applications. For example, as illustrative, non-exclusive examples, other apparatuses 100 that may include one or more self-sealing bladders according to the present disclosure include (but are not limited to) watercraft, land vehicles, spacecraft, automobiles, military vehicles, combat aircraft, rotorcraft, jet fighters, military aircraft, military patrol vehicles, armored limousines, motorsport vehicles, space vehicles, space structures, military armor, boats, performance vehicles, and/or any other apparatus. Moreover, aircraft 101 may take any suitable form, including commercial aircraft, military aircraft, private aircraft, or any other suitable aircraft. While FIG. 1 illustrates aircraft 101 in the form of a fixed wing aircraft, other types and configurations of aircraft are within the scope of aircraft 101 according to the present disclosure, including (but not limited to) helicopters and other rotorcraft.

Aircraft 101 may include a fuselage 108, which also may be referred to herein as a barrel 108, and which generally corresponds to the main body of aircraft 101 for holding passengers, crew, cargo, and/or equipment, for example, depending on the particular configuration and/or function of an aircraft 101. Typically, although not required, the fuselage 108 of an aircraft 101 is elongate and somewhat cylindrical or tubular. In some embodiments, the fuselage 108 may be constructed of multiple sections that are longitudinally spaced along the fuselage 108 and operatively coupled together to define the fuselage 108. Aircraft 101 also may include wings 110, horizontal stabilizers 112, and a vertical stabilizer 114, each of which may be constructed as a unitary structure or in subsections that are subsequently assembled together. One or more containers 102, fuel tanks 104, and/or self-sealing bladders 106 installed therein, may be included anywhere within or coupled to apparatus 100, such as within and/or coupled to fuselage 108, wings 110, horizontal stabilizers 112, and/or vertical stabilizer 114. Generally, one or more containers 102, fuel tanks 104, and/or self-sealing bladders 106 may be coupled to or positioned within any component or structure of apparatus 100, whether apparatus 100 is an aircraft 101 or another type of vehicle.

Figure 2:
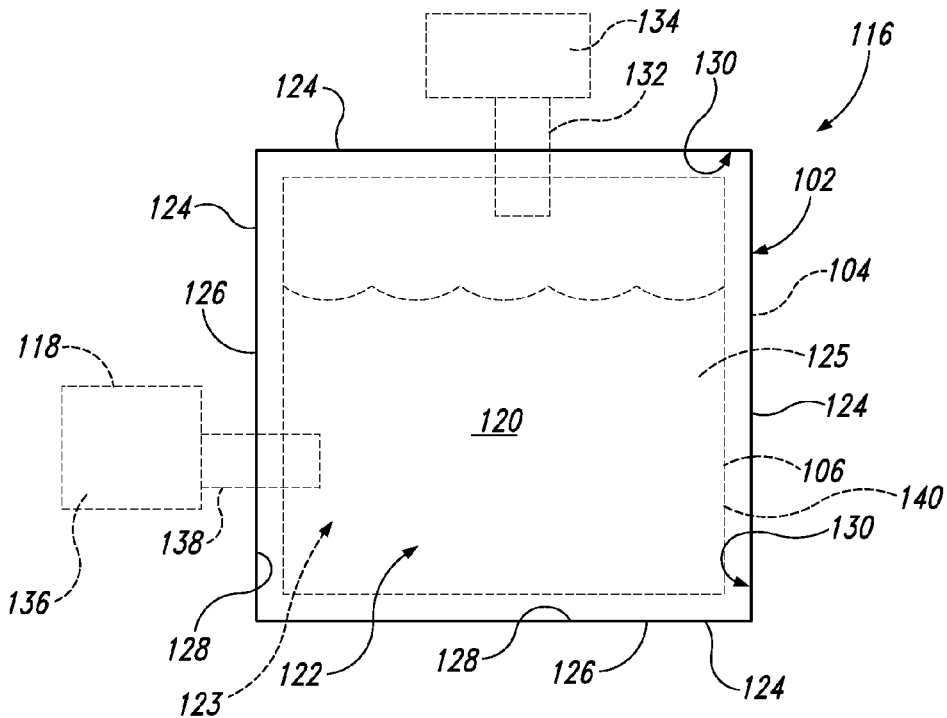
FIG. 2 is a schematic representation of illustrative, non-exclusive examples of containers configured for holding a fluid and that include a self-sealing bladder according to the present disclosure.

Turning now to FIG. 2, examples of a system 116 according to the present disclosure may generally include container 102, self-sealing bladder 106, a fluid source 134, and/or a sealant source 118. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Container 102, which may be, for example, fuel tank 104, may be configured to hold a fluid 120 within an internal space 122 defined by one or more container walls 124. For example, container walls 124 may each have an exterior wall surface 126 that defines the exterior of container 102, and an interior wall surface 128 collectively forming an interior surface 130 of container 102, which defines internal space 122. Internal space 122 may have a volume sufficient to hold fluid 120, as needed or desired for a particular application. For example, in the case of a fuel tank 104, internal space 122 may be configured to be large enough to hold a sufficient volume of fuel 125 (which is an example of fluid 120) for fueling an apparatus (e.g., apparatus 100) for a desired amount of time. For example, internal space 122 may be configured to hold a volume of fluid 120 that is greater than 1 liter (L), greater than 5 L, greater than 10 L, greater than 50 L, greater than 100 L, greater than 500 L, greater than 1,000 L, greater than 5,000 L, greater than 10,000 L, greater than 50,000 L, greater than 100,000 L, and/or greater than 500,000 L. Container 102 can be any type of container, such as a drum, a storage tank, an aircraft fuel tank, a tank, a vehicle fuel tank (e.g., a military vehicle fuel tank), a tank truck, a rotorcraft fuel tank, a combat vehicle fuel tank, and/or any cavity configured to hold a self-sealing bladder 106 according to the present disclosure. Fluid 120 may include one or more of a liquid, a gas, a fuel, a hazardous chemical, a nuclear waste product, an oil, a caustic acid, a corrosive gas, a hazardous waste product, a hypergolic fuel, a synthetic fuel, a hydrocarbon fuel, gasoline, diesel, kerosene, a jet fuel, a fuel additive, and combinations thereof. Self-sealing bladders 106 can be used with any such container 102 and any such fluid 120 in order to provide automatic, passive, sealing of perforations formed therethrough, in order to prevent loss of fluid 120 in the event of such damage to container 102.

Container 102 may include a fluid port 132 that is configured to allow fluid 120 to be flowed into internal space 122 of container 102 (e.g., fluid port 132 may include any opening or access port that may enable passage of fluid 120 into internal space 122 from a location outside internal space 122). Self-sealing bladder 106 may generally be formed of a relatively thin bladder wall 140 surrounding an internal volume 123. Internal volume 123 may be similar in capacity to internal space 122 of container 102, and bladder wall 140 may generally conform to and/or take a similar shape as container walls 124 when self-sealing bladder 106 contains fluid 120 within internal volume 123. Self-sealing bladder 106 may be positioned inside container 102 (e.g., within internal space 122), with fluid 120 being contained within self-sealing bladder 106 (e.g., within internal volume 123, on the inside of bladder wall 140). In some examples, self-sealing bladder 106 may be configured to be inserted into container 102 through fluid port 132. For example, self-sealing bladder 106 may be flexible and compressible enough, with a thin enough bladder wall 140, to be passed into internal space 122 via fluid port 132, and then may be expanded once inside container 102, such as by at least partially filling internal volume 123 of self-sealing bladder 106 with fluid 120. Self-sealing bladder 106 may generally conform to container walls 124 of container 102 once inserted into container 102. Once inserted into container 102, self-sealing bladder 106 may be coupled thereto in some examples, such as by being laced into container 102 with a thermoplastic cord, but other methods are also suitable.

System 116 may include fluid source 134, which may be selectively removably coupled to fluid port 132 (e.g., fluid source 134 may be coupled to fluid port 132 when fluid 120 is being added to container 102 from fluid source 134 via fluid port 132, and fluid source 134 may be decoupled from fluid port 132 when not in use). Fluid source 134 may be a supply of fluid 120, a portion of which may be removed from fluid source 134 in order to at least partially fill container 102 with fluid 120 via fluid port 132. Fluid port 132 may be sealed or closed when not in use (e.g., when not coupled to fluid source 134 and/or when not being used to allow placement of self-sealing bladder 106 within container 102) in order to prevent loss of fluid 120 through fluid port 132.

Sealant source 118 may be a supply of a sealant material 136, which may be inserted (e.g., injected, pumped into, poured into, or otherwise forced into) into a central bladder area 160 (FIG. 3) within bladder wall 140 of self-sealing bladder 106, as will be described in more detail. Sealant source 118 may be configured to hold a volume of sealant material 136 sufficient to fill at least a portion of central bladder area 160 defined within bladder wall 140 of self-sealing bladder 106. Sealant source 118 may be selectively removably coupled to a sealant port 138, which may allow sealant material 136 be inserted into bladder wall 140 of self-sealing bladder 106 before and/or after self-sealing bladder 106 is positioned within container 102. In the event of damage to self-sealing bladder 106, such as a perforation in bladder wall 140, sealant material 136 may be configured to flow through bladder wall 140 towards the site of the perforation, and solidify at the perforation, in order to seal the perforation and substantially prevent loss of fluid 120 from container 102. In some examples, a single sealant source 118 may be operatively coupled in order to supply a plurality of self-sealing bladders with sealant material 136. For example, in an apparatus 100 having multiple containers 102 and multiple self-sealing bladders 106, a single sealant source 118 may be housed in or coupled to apparatus 100 and serve each of the plurality of containers 102 and self-sealing bladders 106. For example, sealant source 118 may be a manually-operated or automatically-operated valve that may be configured to prevent sealant material 136 from exiting sealant source 118 until a perforation is detected to one or more of the containers 102 in a given apparatus 100.

Figure 3:
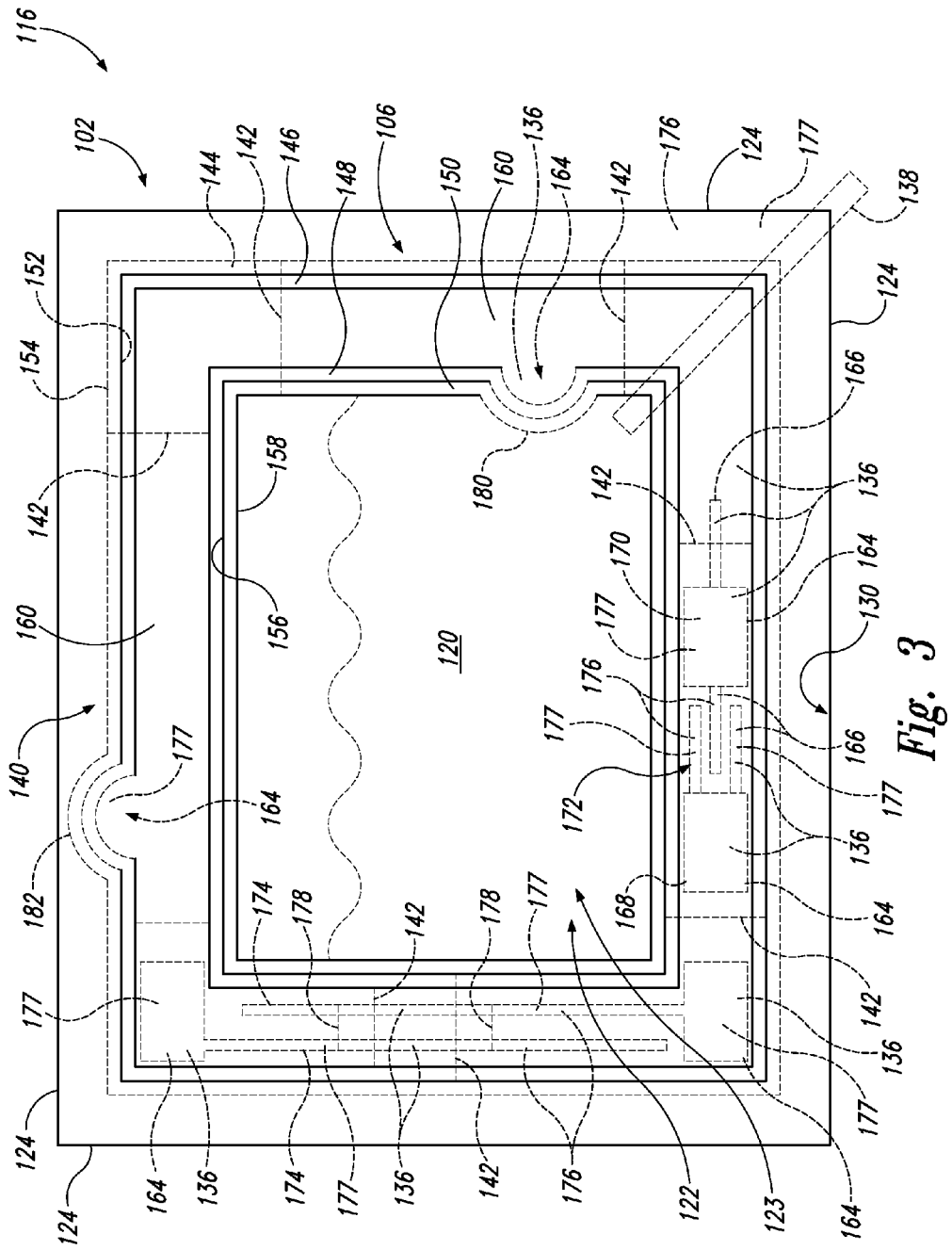
FIG. 3 is a schematic cross-sectional representation of illustrative, non-exclusive examples of containers having a self-sealing bladder according to the present disclosure.

FIG. 3 illustrates a schematic cross-sectional diagram of self-sealing bladder 106 positioned within container 102 (e.g., self-sealing bladder 106 may be positioned inside internal space 122 of container 102, with bladder wall 140 positioned between container walls 124 and fluid 120). Bladder wall 140 may be formed of a plurality of layers of material, some of which may be coupled together via one or more elastomeric threads 142. For example, bladder wall 140 may include a first barrier layer 144, a first sealant-impermeable layer 146, a second sealant-impermeable layer 148, and/or a second barrier layer 150, each of which may themselves include multiple layers in some examples. Central bladder area 160 may be defined between first sealant-impermeable layer 146 and second sealant-impermeable layer 148, and self-sealing bladder 106 may be selectively transformable (e.g., transitionable) between a non-perforated unfilled configuration (FIG. 4) and a non-perforated filled configuration (FIG. 5), such as by at least partially filling central bladder area 160 with a substance, such as sealant material 136. Self-sealing bladder 106 may be selectively induced to a perforated configuration (FIG. 6), where at least a portion of the bladder wall is compromised, such as by intentionally damaging bladder wall 140 (e.g., for testing, experimentation, etc.). In some examples, self-sealing bladder 106 may be induced to a perforated configuration, such as when container 102 is used in a combat application and is perforated (e.g., punctured, torn, pierced, etc.) in combat.

Still with reference to FIG. 3, first barrier layer 144 and second barrier layer 150 may generally be substantially impervious to fluid 120 when not perforated (e.g., when self-sealing bladder 106 is in the non-perforated filled configuration or the non-perforated unfilled configuration), thereby substantially preventing passage of fluid 120 from one side of bladder wall 140 to the other. First barrier layer 144 and second barrier layer 150 may be, for example, a thin polymer film material. First barrier layer 144 and second barrier layer 150 may be formed of an elastomeric material. In one specific example, first barrier layer 144 and/or second barrier layer 150 may include a fluoroelastomer (e.g., Viton®), but any material that is substantially impervious to fluid 120 may be used. As indicated in FIG. 3, some examples of self-sealing bladders 106 may include just second barrier layer 150, without first barrier layer 144.

First sealant-impermeable layer 146 and second sealant-impermeable layer 148 may be configured to add strength and/or structure to bladder wall 140 (e.g., to first barrier layer 144 and second barrier layer 150). First sealant-impermeable layer 146 and/or second sealant-impermeable layer 148 may be formed from fibers (e.g., strands of fibers that are grouped together and woven to form a fiber-based material), and/or first sealant-impermeable layer 146 and/or second sealant-impermeable layer 148 may be formed of materials without fibers. For example, first sealant-impermeable layer 146 and/or second sealant-impermeable layer 148 may be formed of fiberglass, carbon fiber, aramid, polymer fibers, polyamide and/or fibers thereof, polyester and/or fibers thereof, polyethylene terephthalate (PET) and/or fibers thereof, polypropylene and/or fibers thereof, polyoxymethylene and/or fibers thereof, polyethylene and/or fibers thereof, polytetrafluoroethylene (PTFE) and/or fibers thereof, ultra-high molecular weight polyethylene and/or fibers thereof, rubber, and/or combinations thereof. In some examples, first sealant-impermeable layer 146 and/or second sealant-impermeable layer 148 may be formed of a woven fabric material, may be a pre-impregnated composite material, and/or may include a plurality of plies coupled together. In examples where first sealant-impermeable layer 146 and/or second sealant-impermeable layer 148 are formed of fibrous materials, they may include a resin matrix binding the fibers together (e.g., first sealant-impermeable layer 146 and/or second sealant-impermeable layer 148 may be formed of a composite material). Generally, first sealant-impermeable layer 146 and second impermeable layer 148 may be formed of any material or materials that may be configured to contain sealant material 136 within central bladder area 160, between said first sealant-impermeable layer 146 and second sealant-impermeable layer 148. Coupling such layers together into bladder wall 140 may provide a multi-layer bladder wall 140 having characteristics of multiple materials (e.g., bladder wall 140 may be impervious to fluid 120 due to barrier layers 144, 150, and may be flexible yet strong due to sealant-impermeable layers 146, 148). Such construction of bladder wall 140 may generally function to keep sealant material 136 separate from fluid 120 within container 102, until such time that bladder wall 140 is perforated.

First barrier layer 144 may include a first inner surface 152 and a first outer surface 154 opposite first inner surface 152, with "inner" and "outer" being defined with respect to bladder wall 140 (e.g., first inner surface 152 faces central bladder area 160 of bladder wall 140, while first outer surface 154 faces away from central bladder area 160 of bladder wall 140 and may be positioned adjacent interior surface 130 of container 102). Similarly, second barrier layer 150 may include a second inner surface 156 and a second outer surface 158. Second inner surface 156 may be arranged facing first inner surface 152 (e.g., facing central bladder area 160) and second outer surface 158 may be oriented facing away from first outer surface 154 (e.g., first outer surface 154 may be oriented facing away from internal space 122 and towards interior surface 130 of container walls 124, while second outer surface 158 may be oriented facing a center of internal space 122 of container 102 and internal volume 123 of self-sealing bladder 106).

First sealant-impermeable layer 146 may be coupled to first inner surface 152 of first barrier layer 144 (e.g., via an adhesive), and second sealant-impermeable layer 148 may be coupled to second inner surface 156 of second barrier layer 150 (e.g., via an adhesive). Additionally or alternatively, first sealant-impermeable layer 146 may be coupled to second sealant-impermeable layer 148. In some examples, elastomeric thread 142 may couple first sealant-impermeable layer 146 to second sealant-impermeable layer 148. Additionally, elastomeric thread 142 may be coupled to first barrier layer 144 and/or second barrier layer 150. Elastomeric thread 142 may be a single, continuous thread, or may be a plurality of threads. Elastomeric thread 142 may be made of an elastomeric material that allows for stretching, such that applying tension to elastomeric thread 142 allows for elongation of elastomeric thread 142, thereby extending a distance between first sealant-impermeable layer 146 and second sealant-impermeable layer 148, thereby increasing the size of central bladder area 160 between said sealant-impermeable layers. Additionally or alternatively, the function of elastomeric threads 142 may be facilitated or performed by other fasteners, such as rigid tie downs, screws, rivets, nuts, bolts, barbs, tension springs, and/or any other fastener.

Elastomeric thread 142 may be biased to pull first sealant-impermeable layer 146 and second sealant-impermeable layer 148 towards one another. In this manner, elastomeric thread 142 may be configured to allow for variable, elastic separation of first sealant-impermeable layer 146 from second sealant-impermeable layer 148, when elastomeric thread 142 is under tension. In this manner, elastomeric threads 142 may be customized to passively pressurize central bladder area 160, in order that sealant material 136 contained therein may be automatically forced to migrate towards a spaced-away drop in pressure that may occur in the event of a perforation being formed in bladder wall 140. Elastomeric threads 142 may thereby pressurize central bladder area 160 without use of an external pressure source in some examples. Elastomeric thread 142 may be functional to at least partly control or limit the thickness of bladder wall 140 of self-sealing bladder 106, as well as bind together at least some of the layers of bladder wall 140. Elastomeric threads 142 may be configured to pressurize substantially the entire central bladder area 160 such that, in the event of a perforation being formed in bladder wall 140, the entire volume of sealant material 136 container within central bladder area 160 may be drawn on to flow towards and solidify at the perforation, in some examples. Elastomeric threads 142 may be formed of, for example, silicone, polyamides, and/or polychloroprene (e.g., Neoprene®), or any other suitable material.

First sealant-impermeable layer 146 and second sealant-impermeable layer 148 may define central bladder area 160 therebetween, where central bladder area 160 may be configured to receive sealant material 136. The volume of sealant material 136 used may be optimized or altered as desired to accommodate more or less fluid 120 within container 102 (e.g., a smaller volume of sealant material 136 may be used in order to leave more space for a higher volume of fluid 120). Central bladder area 160 may have a variable volume depending on the amount of sealant material 136 within central bladder area 160. For example, with a relatively small amount of sealant material 136 (or no sealant material 136) placed in central bladder area 160, tension from elastomeric threads 142 may force first sealant-impermeable layer 146 and second sealant-impermeable layer 148 to be in contact with each other, or very close together, such that the volume of central bladder area 160 is close to zero, or relatively small. Placing additional sealant material 136 or other material within central bladder area 160 may force central bladder area 160 to expand, thereby increasing the distance between first sealant-impermeable layer 146 and second sealant-impermeable layer 148, thereby increasing the volume of central bladder area 160. For example, forcing sealant material 136 or another material into central bladder area 160 may create enough pressure within central bladder area 160 that elastomeric threads 142 are forced to elastically elongate, thereby increasing the volume of central bladder area 160.

Such a configuration may enable self-sealing bladder 106 to, at least partially, automatically seal a perforated portion 162 (FIG. 6) of self-sealing bladder 106 in a perforated configuration (e.g., in the event that container 102 and/or self-sealing bladder 106 is perforated), thereby substantially preventing loss of fluid 120 from container 102, through perforated portion 162. For example, because sealant material 136 may be pressurized within central bladder area 160, with first sealant-impermeable layer 146 and second sealant-impermeable layer 148 being in constant compression and squeezed together, when damage (e.g., a perforation) occurs to bladder wall 140, sealant material 136 may be forced to migrate and flow towards the perforated portion, where sealant material 136 may be configured to solidify in order to seal the puncture, damage, tear, or other wound in bladder wall 140. The distance of migration of sealant material 136 may be customized, based on factors such as viscosity of sealant material 136, pressure within central bladder area 160, and the distribution of sealant material within localized reservoirs 164 in bladder wall 140.

As shown in FIG. 3, self-sealing bladder 106 may be positioned with respect to container 102 such that first outer surface 154 of first barrier layer 144 is positioned adjacent interior surface 130 of container 102. Fluid 120 inside container 102 may be positioned inside self-sealing bladder 106 such that it is adjacent second barrier layer 150 (e.g., adjacent second outer surface 158 of second barrier layer 150). Thus, bladder wall 140 of self-sealing bladder 106 may be sandwiched between interior surface 130 of container 102 and fluid 120 within container 102.

Self-sealing bladder 106 may contain one or more localized reservoirs 164, which may be at least partially located within central bladder area 160. In some examples, localized reservoir 164 may be a plurality of localized, spaced-apart reservoirs 164. Localized reservoirs 164 may be distributed throughout central bladder area 160 in some examples, or located in just certain portions of central bladder area 160 in other examples. Localized reservoirs 164 may be arranged within self-sealing bladder 106 such that self-sealing bladder 106 contains a certain minimum number of localized reservoirs 164 per unit of surface area. For example, localized reservoirs 164 may be spaced such that there is at least one, at least two, at least three, at least four, at least five, at least six, at least seven, and/or at least eight or more localized reservoirs 164 located in self-sealing bladder 106, in each bladder wall 140, and/or in each respective square foot of the bladder surface area (if self-sealing bladder 106 has a bladder surface area on the order of square feet). Such figures may be scaled up or scaled down, depending on the size of self-sealing bladder 106, the thickness of central bladder area 160, and the size of localized reservoirs 164. Spacing of localized reservoirs 164 may be determined based on factors such as viscosity of sealant material 136, achievable pressure within central bladder area 160, the quantity of sealant material 136 contained within bladder wall 140, and any other design determination for a given application. Localized reservoirs 164 placed on or near the bottom of container 102 may additionally take advantage of the weight of fluid 120 providing extra pressure to central bladder area 160 in those areas. Localized reservoirs 164 may be any shape or size. For example, localized reservoirs 164 may be polygonal in cross-section, substantially spherical, substantially cylindrical, rectangular prisms, substantially hemispherical, irregularly shaped, and/or any other desired shape that may concentrate a desired volume of sealant material 136 in a given area.

One or more channels 166 positioned within central bladder area 160 may be in fluid communication with one or more respective localized reservoirs 164. As used herein, a first structure may be considered in "fluid communication" with a second structure if a substance may pass from the first structure to the second structure. For example, any substance contained within a respective localized reservoir 164 may be free to migrate from the localized reservoir into a respective channel 166 in fluid communication therewith and/or from the channel 166 into the localized reservoir 164. In some examples, one or more channels 166 may extend out from localized reservoir 164. Channels 166 may be substantially tubular in nature, or have any cross-sectional shape, but generally may have a length that is significantly greater than its width and height. Generally, channels 166 can provide a mode for sealant material 136 contained within localized reservoirs 164 to travel away from the respective localized reservoir 164, towards other areas of central bladder area, in the event of a perforation through self-sealing bladder 106. In this way, sealant material 136 may be concentrated in localized reservoirs 164 within central bladder area 160, and migrate towards a perforated portion of self-sealing bladder 106 in the event of such a perforation being formed in self-sealing bladder 106 that causes a reduction in pressure in central bladder area 160 spaced away from the respective localized reservoir 164. Sealant material 136 may be configured to migrate via channels 166, connecting layers 174, and/or through central bladder area 160, and between adjacent localized reservoirs 164, towards the location of the pressure reduction, adjacent the perforated portion of self-sealing bladder 106. Such migration may be automatic and passive, in response to a reduction in pressure in central bladder area 160 due to a perforation through bladder wall 140.

Localized reservoirs 164 and channels 166 may be arranged in any fashion within central bladder area 160. In some examples, channels 166 may extend radially outward from localized reservoirs 164. Each respective channel 166 may be in fluid communication with more than one localized reservoir 164. In some examples, channels 166 extending from different respective localized reservoirs 164 may be arranged with respect to one another in an alternating, or interlocking finger arrangement. For example, a first localized reservoir 168 (which may be an example of localized reservoir 164) may be spaced apart from a second localized reservoir 170 (which may be an example of localized reservoir 164). Each of first localized reservoir 168 and second localized reservoir 170 may include a plurality of channels 166 extending therefrom, where at least one of the channels 166 extending from second localized reservoir 170 may be positioned between respective adjacent channels 166 extending from first localized reservoir 168, such as to form an interlocking finger pattern 172.

Some examples of self-sealing bladders 106 may include one or more connecting layers 174 positioned within central bladder area 160 and in fluid communication with one or more localized reservoirs 164. Connecting layers 174 may be similar in function to channels 166, but may be shaped differently, such as by having a limited height, or thickness, with a relatively much larger length and width. In some examples, respective connecting layers 174 may be positioned at different depths within central bladder area 160. For example, a first connecting layer 174 may be positioned adjacent first sealant-impermeable layer 146, while a second connecting layer 174 may be positioned adjacent second sealant-impermeable layer 148, as shown in FIG. 3. Localized reservoirs 164, channels 166, and/or connecting layers 174 may be formed by any suitable technique, such as thermoplastic welding to form the desired pattern, using adhesive materials, stitching (e.g., using elastomeric threads 142), and/or placing formed materials or structures within bladder wall 140.

Various localized reservoirs 164, channels 166, and/or connecting layers 174 may contain different materials or substances therein. For example, one or more of localized reservoirs 164, channels 166, and/or connecting layers 174 may contain sealant material 136 that is configured to migrate or travel through said channels 166 and/or connecting layers 174. In some examples, sealant material 136 may be present or contained within central bladder area 160, without such channels 164 or connecting layers 174. In some examples, one or more channels 166 and/or connecting layers 174 may contain a non-mobile reactive species 176 that is designed to react with sealant material 136 in the event of a perforation being formed through container 102 and/or self-sealing bladder 106. Additionally or alternatively, non-mobile reactive species 176 may be present in bladder wall 140, such as embedded within first sealant-impermeable layer 146 and/or second sealant-impermeable layer 148, and/or non-mobile reactive species 176 may be contained within or embedded in container 102 (e.g., within container walls 124). Non-mobile reactive species 176 may be, for example, a reactive component that is consumed in a reaction with sealant material 136, or a catalyst which may be configured to cause and/or accelerate a reaction between sealant material 136 and another material. Additionally or alternatively, one or more localized reservoirs 164, channels 166, and/or connecting layers 174 may contain a mobile reactive species 177 that is designed to react with sealant material 136, non-mobile reactive species 176, and/or a different material in bladder wall 140 and/or container walls 124, in the event of a perforation being formed through container 102 and/or self-sealing bladder 106. Additionally or alternatively, mobile reactive species 177 may be present in bladder wall 140, such as embedded within first sealant-impermeable layer 146 and/or second sealant-impermeable layer 148. In some examples, different respective localized reservoirs 164, channels 166, and/or connecting layers 174 may contain different substances. For example, one or more respective localized reservoirs 164, channels 166, and/or connecting layers 174 may contain sealant material 136, while one or more different respective localized reservoirs 164, channels 166, and/or connecting layers 174 may contain non-mobile reactive species 176, mobile reactive species 177, and/or a different material.

In some examples, one or more tack locations 178 may be utilized to connect adjacent connecting layers 174. Tack locations 178 may serve to limit movement of adjacent connecting layers 176 with respect to one another, but may not provide fluid communication between adjacent connecting layers 176. This may enable adjacent connecting layers to contain different materials (e.g., sealant material 136 in one connecting layer 174, non-mobile reactive species 176 in a different connecting layer 174, and/or mobile reactive species 177 in another connecting layer 174), such that the different materials are kept separate until bladder wall 140 of self-sealing bladder 106 is breached, due to a perforation being formed through container 102 and self-sealing bladder 106.

In some examples, localized reservoirs 164 may be formed by distinct structures formed within central bladder area 160. Additionally or alternatively, localized reservoirs may be formed by localized bulges or expansions formed in bladder wall 140. For example, localized areas of second barrier layer 150 and second sealant-impermeable layer 148, and/or localized areas of first barrier layer 144 and first sealant-impermeable layer 146 may be configured to form localized, larger spaces within central bladder area, thereby forming one or more localized reservoirs 164. For example, localized reservoirs 164 may be formed integrally within central bladder area 160 by second barrier layer 150 and second sealant-impermeable layer 148, such as by expanded regions 180 of second sealant-impermeable layer 148 being spaced further away from first sealant-impermeable layer 146 than adjacent regions of second sealant-impermeable layer 148. Similarly, localized reservoirs 164 may be formed integrally within central bladder area 160 by first barrier layer 144 and first sealant-impermeable layer 146, such as by expanded regions 182 of first sealant-impermeable layer 146 being spaced further away from second sealant-impermeable layer 148 than adjacent regions of first sealant-impermeable layer 146. Expanded regions 180 of second sealant-impermeable layer 148 and expanded regions 182 of first sealant-impermeable layer 146, when present, respectively, may be positioned in corresponding locations to each other, and/or may be spaced apart from each other. Elastomeric threads 142 may be configured to create a plurality of connections between first sealant-impermeable layer 146 second sealant-impermeable layer 148 between localized reservoirs 164 of any type. In some examples, one or more localized reservoirs 164 may be coupled to second barrier layer 150, second sealant-impermeable layer 148, first sealant-impermeable layer 146, and/or first barrier layer 144 via one or more fittings. For example, fittings may be utilized in a self-sealing bladder that uses a spring system and a canister of pressurized inert gas to pressurize central bladder area 160, if desired. Additionally or alternatively, one or more localized reservoirs 164 may be directly connected to first sealant-impermeable layer 146, first barrier layer 144, second sealant-impermeable layer 148, and/or second barrier layer 150 without a fitting.

Sealant port 138 may be configured to allow sealant material 136, non-mobile reactive species 176, mobile reactive species 177, and/or another material to be inserted or injected into central bladder area 160, such as by using a pump to insert material via sealant port 138. Sealant port 138 may include, for example, a valve, a fitting, a coupling, and/or any other opening or entry port that may be configured to allow passage of sealant material 136 from sealant source 118 into central bladder area 160. Sealant port 138 may be accessible through either or both sides of bladder wall 140. In some examples, sealant port 138 may be coupled to first barrier layer 144 and provide a passage through first barrier layer 144 and first sealant-impermeable layer 146, such that sealant material 136 (and/or another material) may be passed from a location spaced-apart from self-sealing bladder 106 (e.g., within sealant source 118 of FIG. 2) to central bladder area 160. Additionally or alternatively, sealant port 138 may be coupled to second barrier layer 150 and provide a passage through second barrier layer 150 and second sealant-impermeable layer 148 such that sealant material 136 (and/or another material) may be passed from a location spaced-apart from self-sealing bladder 106 to central bladder area 160.

In some examples, sealant material 136 may be distributed substantially throughout the entire central bladder area 160. Sealant material 136 may be inserted into central bladder area 160 such that it is forced into localized reservoirs 164 and at least partially fills one or more localized reservoirs 164. Sealant material 136 may be chosen based on the type of fluid 120 that container 102 is intended to hold. For example, sealant material 136 may be selected to be insoluble in fluid 120 (e.g., sealant material 136 may be insoluble in fuel (e.g., jet fuel) in examples where fuel will be contained by container 102). In some examples, sealant material 136 (or other material(s) contained in central bladder area 160) may be reactive with fluid 120 (or constituents thereof and/or additives therein), or may be non-reactive with fluid 120, as desired. Sealant material 136 may include a liquid, a gas, and/or a combination thereof. Sealant material 136 may be elastomeric and/or viscoelastic, in some examples. In one specific example, sealant material 136 may include one or more of a gum-based material, ethylene glycol, propylene glycol, polyethylene glycol, polyvinyl alcohol, hydroxyethyl cellulose, urethane, plasticized urethane, silicone, fluorosilicone, water, nitrile rubber, polybutadiene, polyester urethane, rubber, synthetic rubber, fluorosilicone rubber, fluorocarbon rubber, styrene butadiene, perfluorocarbon rubber, silicone-based rubbers, polysulfide, and/or any other material having suitable properties for the practical application of self-sealing bladders 106. In some examples, any sealant material 136 that allows for lateral flow through the structure of central bladder area 160 towards a penetration or perforation may be contained within central bladder area 160.

Sealant material 136 may be selected based on its ability to "set," (e.g., cure, react, solidify, and/or harden), when exposed to various substances. For example, sealant material 136 may be selected such that it sets when exposed to oxygen, air, fluid 120, non-mobile reactive species 176, mobile reactive species 177, and/or some other predetermined material contained within container 102 (e.g., inside internal space 122 of container 102 and/or within container walls 124) and/or self-sealing bladder 106. Generally, sealant material 136 may be contained within central bladder area 160 such that it is separated from the agent that causes it to set (e.g., for a sealant material that solidifies or hardens when it contacts fuel, self-sealing bladder 106 may be configured to keep sealant material 136 separate from fluid 120 (e.g., a fuel) within container 102, by virtue of being contained within central bladder area 160) unless and until bladder wall 140 is punctured, at which point sealant material 136 would be allowed to contact the agent, and therefore harden, in order to seal the puncture wound. Sealant material 136 may be configured to cure at ambient temperatures.

The speed at which sealant material 136 migrates towards a puncture wound or other perforation formed in bladder wall 140 may be customized by the tension of elastomeric threads 142, pressure within central bladder area 160, and/or viscosity of sealant material 136. Suitable sealant materials 136 may have a wide range of viscosities. In some examples, a low viscosity sealant material 136, such as a gas or liquid, may be used. In some examples, a higher viscosity sealant material 136 may be used. Viscosity of various sealant materials at 25° C. can vary greatly. For example, sealant material 136 may have a viscosity of less than 1 centipoise (1 cP), less than 2 cP, less than 3 cP, less than 5 cP, less than 10 cP, less than 100 cP, and/or less than 1,000 cP. In some examples, sealant material 136 may have a viscosity of greater than 1,000 cP, greater than 5,000 cP, greater than 10 Pascal-seconds (Pa·s) (e.g., greater than 10,000 cP), greater than 25 Pa·s, greater than 50 Pa·s, greater than 100 Pa·s, greater than 250 Pa·s, greater than 500 Pa·s, and/or greater than 1,000 Pa·s.

Where appropriate, the reference numerals from the schematic illustrations of FIGS. 2-3 are used to designate corresponding parts of FIGS. 4-16 (which also are schematic in nature); however, the examples of FIGS. 4-16 are non-exclusive and do not limit self-sealing bladders 106 and systems 116 to the illustrated embodiments of FIGS. 4-16. That is, self-sealing bladders 106 and systems 116 may incorporate any number of the various aspects, configurations, characteristics, properties, etc. that are illustrated in and discussed with reference to the schematic representations of FIGS. 2-3 and/or the embodiments of FIGS. 4-16, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 4-16; however, it is within the scope of the present disclosure that the previously discussed features, variants, etc. may be utilized with any of the illustrated examples.

Figure 4:
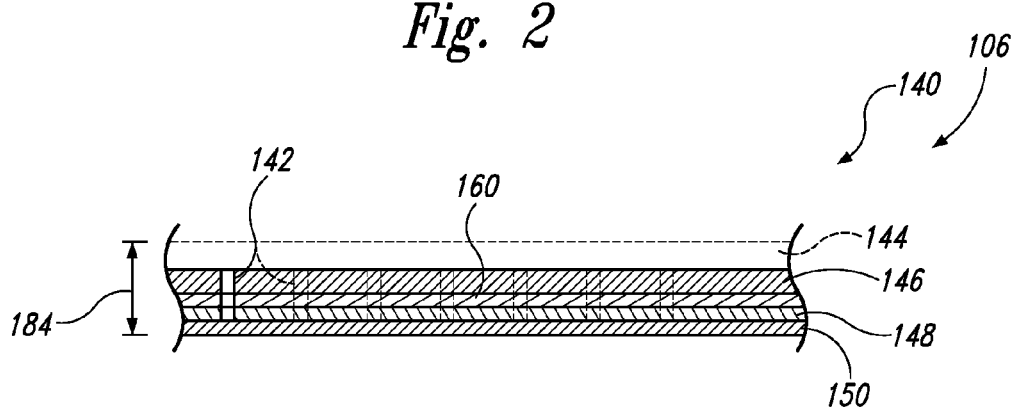
FIG. 4 is a schematic cross-sectional representation of a portion of illustrative, non-exclusive examples of self-sealing bladders according to the present disclosure, shown in a non-perforated, unfilled configuration.
Figure 5:
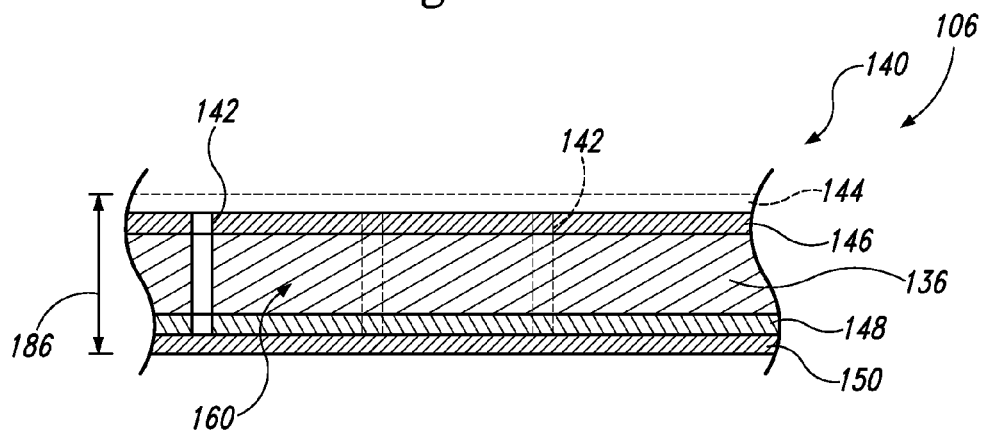
FIG. 5 is a schematic cross-sectional representation of a portion of illustrative, non-exclusive examples of self-sealing bladders according to the present disclosure, shown in a non-perforated, filled configuration.
Figure 6:
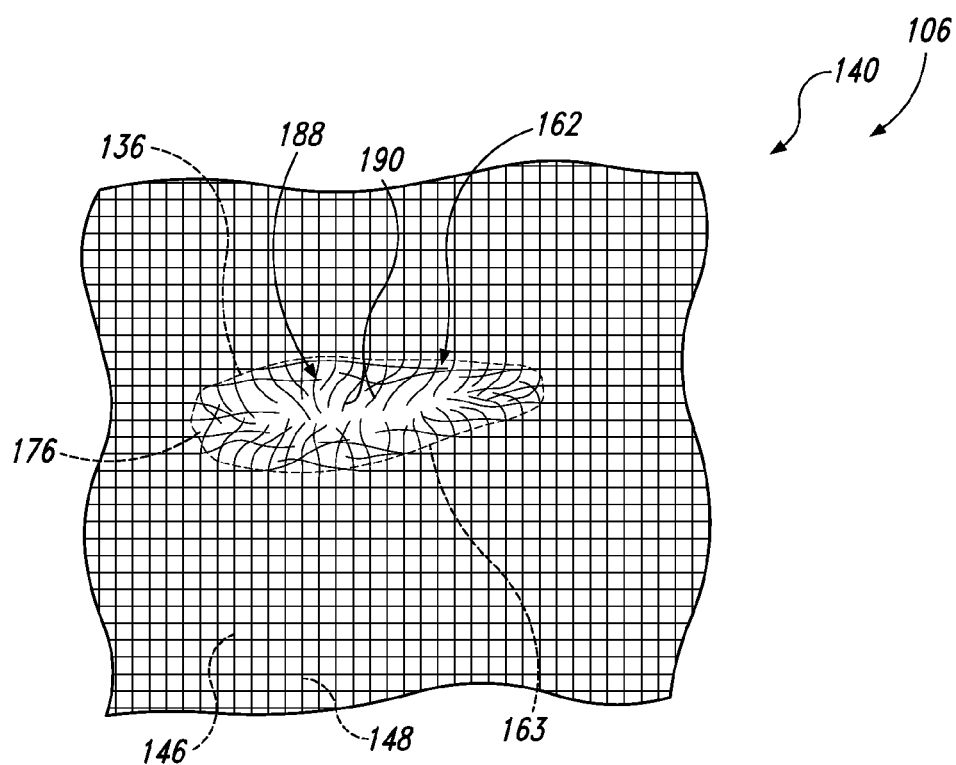
FIG. 6 is a schematic representation of a portion of illustrative, non-exclusive examples of self-sealing bladders according to the present disclosure, shown in a perforated configuration.

As shown in FIGS. 4-6, self-sealing bladder 106 may be selectively configurable into a plurality of different configurations. For example, self-sealing bladder 106 may have a non-perforated unfilled configuration (FIG. 4), a non-perforated filled configuration (FIG. 5), and a perforated configuration (FIG. 6). In the non-perforated unfilled configuration of FIG. 4, first sealant-impermeable layer 146 may be positioned adjacent second sealant-impermeable layer 148, and may even be in contact with second sealant-impermeable layer 148, in some examples. In the non-perforated unfilled configuration, central bladder area 160 may be substantially devoid of sealant material 136, non-mobile reactive species 176, mobile reactive species 177, and/or any other materials that may be injected or inserted into central bladder area 160 (e.g., into central bladder area 160 directly, and/or into one or more localized reservoirs 164, channels 166, and/or connecting layers 174). Elastomeric threads 142 may be configured to compress first sealant-impermeable layer 146 and second sealant-impermeable layer 148 together, thereby compressing central bladder area 160 to a minimal volume, in the non-perforated unfilled configuration. Thus, an unfilled thickness 184 of bladder wall 140 in the non-perforated unfilled configuration may be at a minimum.

At least a portion of central bladder area 160 between first sealant-impermeable layer 146 and second sealant-impermeable layer 148 may be selectively filled (e.g., with sealant material 136, via sealant port 138), in order to transition self-sealing bladder 106 to the non-perforated filled configuration shown in FIG. 5. As used herein, self-sealing bladder 106 may be in the non-perforated filled configuration even if central bladder area 160 is less than completely filled with sealant material 136 and/or other material. As compared with the non-perforated unfilled configuration of FIG. 4, central bladder area 160 may be expanded in the non-perforated filled configuration of FIG. 5, with first sealant-impermeable layer 146 and second sealant-impermeable layer 148 being spaced further apart in the non-perforated filled configuration, due to presence of sealant material 136 (and/or another material) within central bladder area 160 (e.g., within one or more localized reservoirs 164, channels 166, and/or connecting layers 174) causing extension of elastomeric threads 142 and enlargement of the volume of central bladder area 160. Such insertion of material into central bladder area 160 may increase the thickness of bladder wall 140 from unfilled thickness 184 (FIG. 4; defined by first barrier layer 144, first sealant-impermeable layer 146, second sealant-impermeable layer 148, and second barrier layer 150)) to a filled thickness 186 (FIG. 5; defined by first barrier layer 144, first sealant-impermeable layer 146, second sealant-impermeable layer 148, second barrier layer 150, and sealant material 136). While the configuration of FIG. 5 is referred to as a "filled" configuration, central bladder area 160 need not be maximally filled in order to be in the non-perforated filled configuration. As used herein, "filled" means "at least partially filled," such that central bladder area 160 (and/or structures therein) contain at least some material, such as sealant material 136. Furthermore, filled thickness 186 may be defined as an average wall thickness in a filled configuration, in order to take into account examples of self-sealing bladders 106 having expanded regions 180 and/or 182.

In specific examples, bladder wall 140 may have an unfilled thickness 184 of less than about 2 inches (in) (5 cm), less than about 1.5 in (3.8 cm), less than about 1 in (2.5 cm), less than about 0.75 in (1.9 cm), less than about 0.5 in (1.27 cm), less than about 0.25 in (0.64 cm), less than about 0.1 in (0.25 cm), and/or less than about 0.05 in (0.13 cm). The average filled thickness 186 generally may be greater than unfilled thickness 184, and may be greater than about 2 inches (in) (5 cm), greater than about 1.5 in (3.8 cm), greater than about 1 in (2.5 cm), greater than about 0.75 in (1.9 cm), greater than about 0.5 in (1.27 cm), greater than about 0.25 in (0.64 cm), and/or greater than about 0.1 in (0.25 cm).

In the non-perforated filled configuration of FIG. 5, elastomeric thread 142 may be configured such that it causes pressurization of central bladder area 160 when a sufficient volume of sealant material 136 (and/or other material) is inserted into central bladder area 160. For example, when enough sealant material 136 is inserted into central bladder area 160 such that elastomeric threads 142 are forced to elongate, the tension from elastomeric threads 142 pulling sealant-impermeable layers 146, 148 towards one another may cause sealant material 136 within central bladder area 160 to be pressurized and squeezed between first sealant-impermeable layer 146 and second sealant-impermeable layer 148. In some examples, central bladder area 160 may be configured to have a greater pressure than the head pressure of fluid 120 inside container 102. For example, bladder wall 140 may be configured such that with a sufficient volume of sealant material 136 within central bladder area 160, a sealant pressure of sealant material 136 may be at least 0.1 psi, 0.25 psi, 0.5 psi, 1 psi, 2.5 psi, 5 psi, and/or at least 10 psi greater than the head pressure of fluid 120 inside container 102.

FIG. 6 illustrates a portion of a surface of a sealant-impermeable layer (e.g., first sealant-impermeable layer 146 or second sealant-impermeable layer 148) of self-sealing bladder 106, having a perforated portion 162 formed therein. Perforated portion 162 may be, for example, a rip, a tear, a penetration, a puncture, and/or any other perforation formed through bladder wall 140, such as caused by a projectile that is caused to hit container 102 and/or self-sealing bladder 106, thereby compromising fluid 120 contained within container 102. Perforated portion 162 may be, for example, a puncture or tear through at least a portion of first barrier layer 144, first sealant-impermeable layer 146, second sealant-impermeable layer 148, and/or second barrier 150. In other words, perforated portion 162 may extend through the entire bladder wall 140, or through just a portion of it. Due to the compromise of first barrier layer 144 and/or second barrier layer 150 at the site of perforated portion 162, first barrier layer 144 and/or second barrier layer 150 may no longer be impervious to fluid 120 in the perforated configuration of FIG. 6, due to the ability of fluid 120 to flow through the barrier layers at perforated portion 162.

As discussed, self-sealing bladder 106 may be configured to automatically seal such a perforated portion 162, by virtue of sealant material 136 being passively forced to migrate towards perforated portion 162, due to the design of self-sealing bladder 106, whereupon sealant material 136 may be configured to harden at the location of perforated portion 162, thereby sealing and repairing perforated portion 162, due to reaction of sealant material 136 with one or more of air, oxygen, fluid 120, any substance contained within bladder wall 140, any mobile reactive species 177, and any non-mobile reactive species 176 contained within bladder wall 140. Hardening of sealant material 136 at the location of perforated portion 162 may seal perforated portion 162, thereby substantially preventing loss of fluid 120 through perforated portion 162. Self-sealing bladders 106 may be configured to automatically seal perforated portions 162 of various sizes, such as 14.5 mm in length or larger. In some examples, self-sealing bladders 106 may be configured to automatically seal a puncture in bladder wall 140 from a tumbled 0.5 caliber projectile. In some examples, self-sealing bladders 106 may be configured to automatically seal a perforated portion 162 quickly within a sealing time period, such as in less than 4 minutes, less than 2 minutes, less than 1 minute, less than 30 seconds, less than 15 seconds, less than 10 seconds, less than 5 seconds, less than 2 seconds, and/or less than 1 second.

Upon formation of perforated portion 162, compression of central bladder area 160 due to elastomeric threads 142 (FIGS. 3-5) may cause sealant material 136 and/or mobile reactive species 177 contained in one or more localized reservoirs 164, channels 166, and/or connecting layers 174, to be squeezed out of or through the respective structure and migrate towards perforated portion 162 and/or react together in order to seal perforated portion 162. Additionally or alternatively, formation of perforated portion 162 may result in breach of a respective channel 166 and/or connecting layer 174 containing non-mobile reactive species 176, which may then cause non-mobile reactive species 176 to be present at perforated portion 162, by allowing non-mobile reactive species 176 to escape the channel 166 and/or connecting layer 174 at the site of the breach (e.g., adjacent perforated portion 162). FIG. 6 shows a formation 163 of hardened sealant material 136, mobile reactive species 177, and/or non-mobile reactive species 176, in dashed line, that has pooled and solidified around perforated portion 162 to seal the same. Formation 163 of sealant material 136 may be flexible, semi-flexible, elastic, semi-rigid, and/or rigid once sealant material 136 (or other materials in formation 163) has hardened. In some examples, sealant material 136 may be configured to foam during solidification.

In some examples, first sealant-impermeable layer 146 and/or second sealant-impermeable layer 148 may be configured to form a scaffold structure 188 adjacent perforated portion 162, the scaffold structure 188 being formed of a plurality of fiber ends 190 when the respective layer is punctured or otherwise perforated. Sealant material 136 may harden onto scaffold structure 188, thereby aiding in sealing of perforated portion 162. Scaffold structure 188 may aid in sealing perforated portion 162 and/or holding the shape of the solidified sealant material 136 at or near the site of perforated portion 162. For example, scaffold structure 188 may essentially serve as a platform for, or internal structure for, sealant material 136, in order to reinforce sealant material 136 and/or facilitate coupling of formation 163 to the non-perforated portion of the sealant-impermeable layer.

Figure 7:
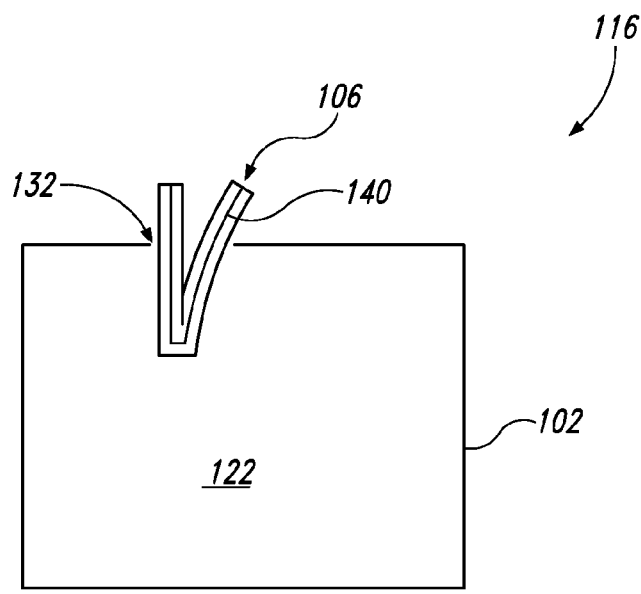
FIG. 7 is a schematic cross-sectional representation of illustrative, non-exclusive examples of self-sealing bladders according to the present disclosure, shown being inserted into a container.

FIG. 7 schematically illustrates an example of self-sealing bladder 106, in the process of being inserted into container 102, via fluid port 132. As illustrated, bladder wall 140 of self-sealing bladder 106 may be flexible enough to be compressed and folded into a small enough profile (e.g., with internal volume 123 collapsed) that it may be inserted through fluid port 132, which is configured for filling container 102 with fluid 120. Self-sealing bladder 106 may be more flexible than prior art devices, which may in part be due to a reduced average thickness of the bladder wall as compared to prior art devices in some examples. Because the presently disclosed self-sealing bladders 106 provide for migration of sealant material 136 to perforated portion 162, as well as distribution of sealant material 136 into localized, spaced-apart reservoirs 164, the overall volume of sealant material 136 may be reduced as compared to prior art devices. As a result, the overall average thickness of bladder wall 140 may be reduced as compared to prior art devices, which may be at least partly due to a reduced volume of sealant material 136. Additionally or alternatively, such thinner bladder walls 140 may reduce the weight of self-sealing bladder 106 as compared to prior art devices, and/or may increase available volume within container 102 for fluid 120 once self-sealing bladder 106 is placed inside container 102.

Self-sealing bladder 106 generally may be inserted into container 102 before it is at least partially filled with fluid 120. Self-sealing bladder 106 may be inserted into container 102 before and/or after any sealant material 136 (FIGS. 3 and 5) is inserted into bladder wall 140. Furthermore, self-sealing bladder 106 may be removable from container 102, such as through fluid port 132. For example, in the event that self-sealing bladder 106 is perforated, self-sealing bladder 106 may be removed, repaired, re-inflated with new sealant material, and/or re-inserted into container 102.

Figure 8:
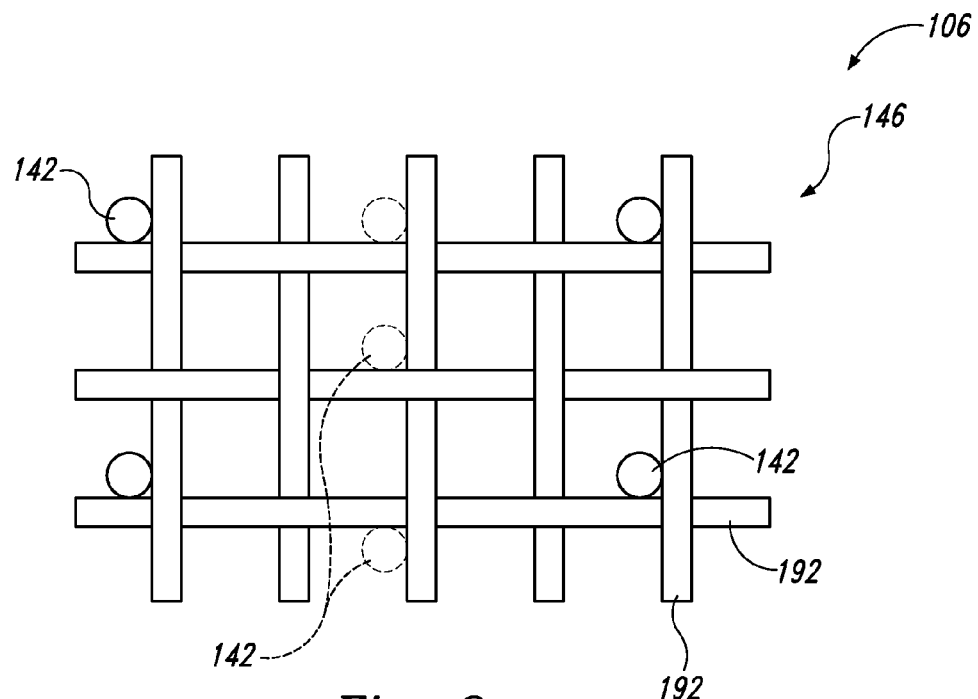
FIG. 8 is a schematic representation of illustrative, non-exclusive examples of a portion of a self-sealing bladder according to the present disclosure, shown from a top plan view.

FIG. 8 is a schematic representation of a close-up view of the surface of first sealant-impermeable layer 146, showing that first sealant-impermeable layer 146 may be a woven fabric, such as a fabric woven from overlapping strands 192 of fiber or other material (e.g., fiberglass, carbon fiber, aramid, polymer fibers, polyamide, polyester, polyethylene terephthalate (PET), polypropylene, polyoxymethylene, polyethylene, polytetrafluoroethylene (PTFE), and/or ultra-high molecular weight polyethylene). FIG. 8 illustrates a plurality of elastomeric threads 142 extending through the thickness of first sealant-impermeable layer 146, with elastomeric threads 142 oriented substantially perpendicularly to the surface of first sealant-impermeable layer 146. Elastomeric threads 142 may extend into bladder wall 140, through central bladder area 160 (FIGS. 4-5), and into second sealant-impermeable layer 148, in order to elastically couple first sealant-impermeable layer 146 to second sealant-impermeable layer 148. Elastomeric threads 142 may be present in any suitable number in order to provide desired variability of the distance between first sealant-impermeable layer 146 and second sealant-impermeable layer 148 (e.g., the thickness of central bladder area 160) and/or the desired pressure within central bladder area 160 when filled with sealant material 136 and/or other material. More or fewer elastomeric threads 142 may be included in a given example than are shown in FIG. 8, and elastomeric threads 142 may be distributed in any pattern or arrangement, or randomly throughout the sealant-impermeable layers.

Figure 9:
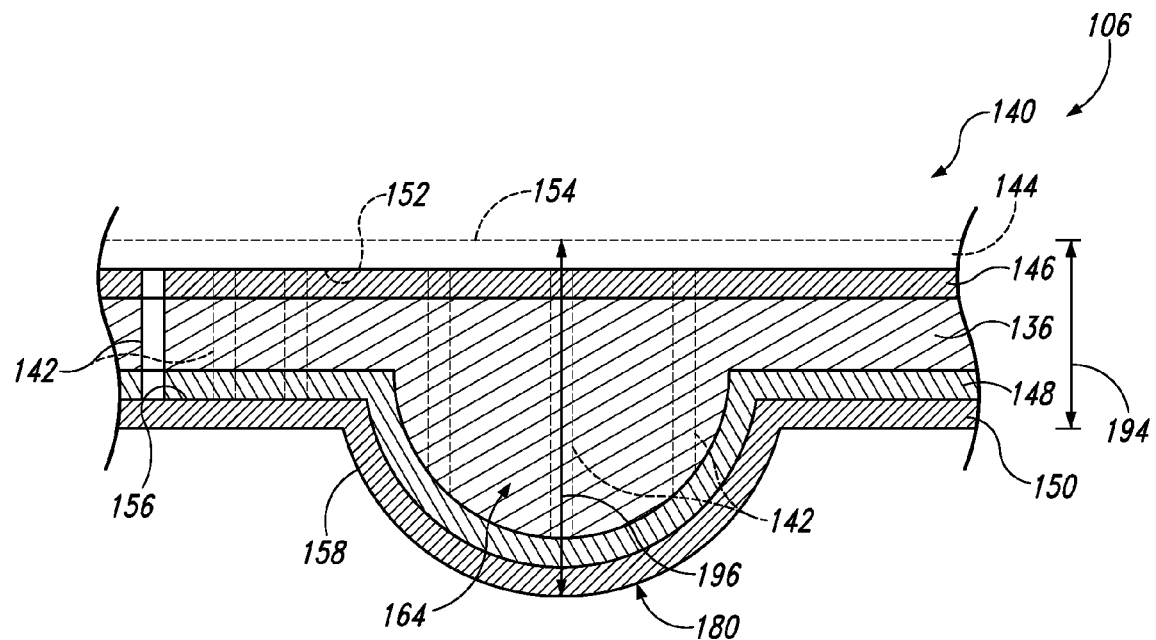
FIG. 9 is a schematic cross-sectional representation of illustrative, non-exclusive examples of a portion of seal-sealing bladders having distributed localized reservoirs for a sealant material, according to the present disclosure.

FIG. 9 illustrates a schematic view of a portion of a cross-section of bladder wall 140 of self-sealing bladder 106 according to the present disclosure, in a non-perforated filled configuration. FIG. 9 shows a localized reservoir 164 formed integrally with central bladder area 160, defined by an expanded region 180, where a localized portion of second sealant-impermeable layer 148 is distended such that it is farther away from first sealant-impermeable layer 146 in expanded region 180 than are adjacent portions of second sealant-impermeable layer 148. While FIG. 9 shows only a portion of bladder wall 140, a given self-sealing bladder can include a plurality of such localized reservoirs 164, spaced apart from one another and formed at various locations along bladder wall 140. As a result, the thickness of bladder wall 140 may vary across the surface of bladder wall 140, with some areas having a reduced thickness, indicated by a nominal wall thickness 194, and other areas (corresponding to localized reservoirs 164) having an enlarged thickness 196. The enlarged thickness 196 may be a maximum reservoir thickness, and may be greater than about 2 inches (5 cm), greater than about 1.5 inches (3.8 cm), greater than about 1 inch (2.5 cm), greater than about 0.75 inches (1.9 cm), greater than about 0.5 inches (1.27 cm), greater than about 0.25 inches (0.64 cm), greater than about 0.125 inches (0.32 cm), and/or greater than about 0.063 inches (0.16 cm).

In contrast to the examples of FIG. 9, and as shown in FIGS. 10-16, localized reservoirs 164 may not affect the overall thickness of bladder wall 140 in some examples. FIGS. 10-13 illustrate schematic representations of localized reservoirs 164 that may be formed within a central bladder area 160 of a self-sealing bladder 106 according to the present disclosure, viewed looking into the depth of the thickness of bladder wall 140, as if showing an elevation view of bladder wall 140, with first barrier layer 144 and first sealant-impermeable layer 146 removed, so central bladder area 160 is visible. FIG. 10 shows one arrangement of a localized reservoir 164, with a plurality of channels 166 extending therefrom. Channels 166 may provide for migration of sealant material 136 from localized reservoir 164, through one or more channels 166, towards a perforated portion of bladder wall 140. The plurality of channels 166 are shown arranged in rows, parallel to one another, and spaced apart from adjacent channels 166, but other arrangements are possible. In some examples, adjacent channels 166 may be spaced close enough to each other such that the smallest anticipated puncture would rupture at least one channel 166 no matter where the projectile hit bladder wall 140.

FIG. 11 shows a similar arrangement, with a first localized reservoir 168 and a second localized reservoir 170 spaced apart from first localized reservoir 168. First localized reservoir 168 may include a first respective plurality of channels 166 extending therefrom, and second localized reservoir 170 may include a second respective plurality of channels 166 extending therefrom. In some examples, the channels 166 extending from first localized reservoir 168 may be arranged with respect to the channels 166 extending from second localized reservoir 170 to form interlocking finger pattern 172. In some examples, first localized reservoir 168 may contain a different material than second localized reservoir 170. For example, first localized reservoir 168 may contain sealant material 136, while second localized reservoir 170 may contain mobile reactive species 177 and/or another material (or vice versa). In other examples, first localized reservoir 168 and second localized reservoir 170 may contain the same material. In some examples, channels 166 may be arranged such that adjacent channels are close enough together that, with any anticipated puncture, at least two channels 166 are ruptured, one of the two channels being in fluid communication with first localized reservoir 168 and the other of the two channels being in fluid communication with second localized reservoir 170.

FIG. 12 illustrates a schematic view of a localized reservoir 164 having a plurality of channels 166 extending radially therefrom, within central bladder area 160. Central bladder area 160 may include a plurality of such localized reservoirs 164, which may be positioned with respect to one another such that respective channels 166 extending from each respective localized reservoir 164 may at least partially overlap one another or extend into a space between adjacent channels 166. Each localized reservoir 164 may include more or fewer channels 166 extending therefrom, as desired. As shown in FIG. 13, a given system of channels 166 may include one or more radially extending channels 198 and/or one or more circumferential channels 200. Circumferential channel 200 may provide fluid communication between itself and radially extending channels 198 in some examples. Similarly, parallel channels 166 of FIGS. 10-11 may include other channels extending at different angles or connecting the parallel channels, such that an interconnected network of channels 166 may be formed within central bladder area 160.

Figure 14:
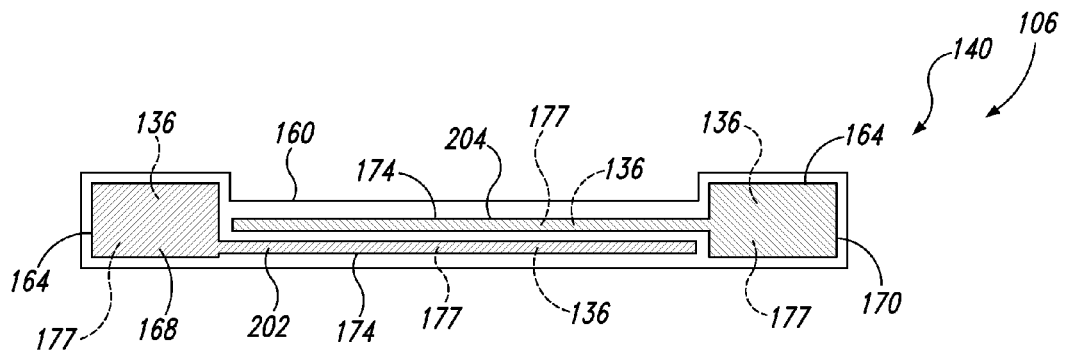
FIG. 14 is a schematic cross-sectional representation of an illustrative, non-exclusive example of a portion of a central bladder area of presently disclosed self-sealing bladders, having two localized reservoirs, each with a respective connecting layer in fluid communication therewith.
Figure 15:
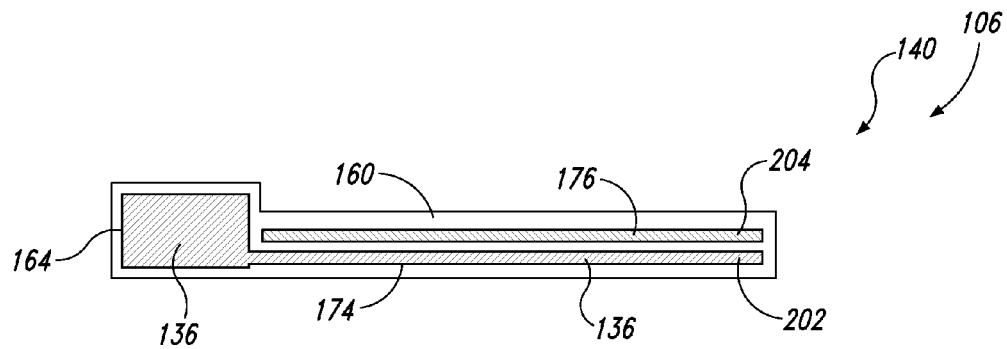
FIG. 15 is a schematic cross-sectional representation of an illustrative, non-exclusive example of a portion of a central bladder area of presently disclosed self-sealing bladders, having a localized reservoir in fluid communication with a first connecting layer, and a separate, second connecting layer.
Figure 16:
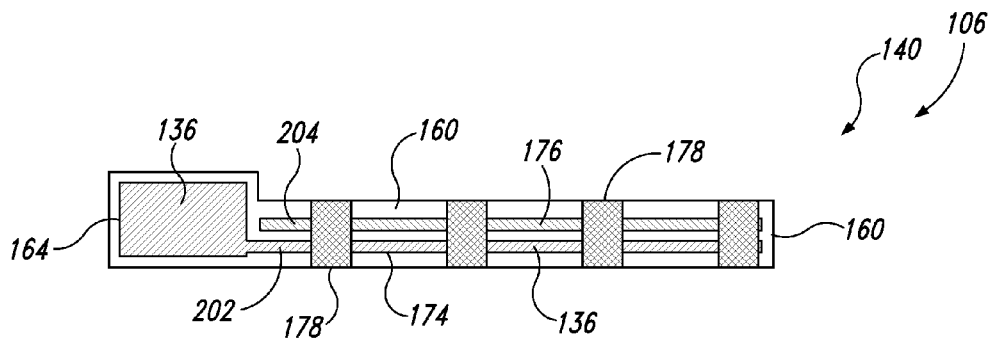
FIG. 16 is a schematic cross-sectional representation of an illustrative, non-exclusive example of a portion of a central bladder area of presently disclosed self-sealing bladders, having a plurality of connections through the central bladder area.

FIGS. 14-16 illustrate schematic representations of cross-sections of portions of bladder walls 140 of self-sealing bladders 106 according to the present disclosure. Each of the examples of FIGS. 14-16 include one or more localized reservoirs 164 in fluid communication with one or more connecting layers 174 within central bladder area 160 of bladder wall 140 of self-sealing bladder 106. As shown in FIG. 14, first localized reservoir 168 may be spaced apart from second localized reservoir 170, each having a respective connecting layer 174 extending therefrom and in fluid communication with the respective reservoir (e.g., a first connecting layer 202 may extend from and be in fluid communication with first localized reservoir 168, while a second connecting layer 204 may extend from and be in fluid communication with second localized reservoir 170). Connecting layers 174 and localized reservoirs 164 all may contain sealant material 136 in some examples, or first localized reservoir 168 and second localized reservoir 170 (and their respective connecting layers 202, 204) may contain different materials in some examples. For example, first localized reservoir 168 and first connecting layer 202 may contain sealant material, while second localized reservoir 170 and second connecting layer 204 may contain mobile reactive species 177. In the event of a perforation being formed through bladder wall 140, localized reservoirs 168, 170 and connecting layers 202, 204 may be breached at the site of the perforation such that the respective material in first localized reservoir 168 and first connecting layer 202 is allowed to contact and react with the respective material in second localized reservoir 170 and second connecting layer 204. A seal may thereby be formed adjacent the damage. Respective connecting layers 202, 204 each may extend over substantially the same surface area within central bladder area 160, with one (e.g., second connecting layer 204) being positioned adjacent first sealant-impermeable layer 146 (FIG. 3) and the other (e.g., first connecting layer 202) being positioned adjacent second sealant-impermeable layer 148 (FIG. 3) on opposite sides of central bladder area 160.

FIG. 15 shows a similar configuration as FIG. 14, except that second connecting layer 204 may contain non-mobile reactive species 176 and/or may not include a second localized reservoir. In the event of a breach in (e.g., a perforation formed in) bladder wall 140 in the configuration of FIG. 15, the material contained in localized reservoir 164 (e.g., sealant material 136 or mobile reactive species 177) may migrate via first connecting layer 202 to the site of the breach and react with non-mobile species 176 contained in second connecting layer 204 adjacent the site of the perforation that breaches second connecting layer 204 and first connecting layer 202. FIG. 16 shows the same configuration as FIG. 15, but includes a plurality of tack locations 178 that may be configured to connect first connecting layer 202 to second connecting layer 204, without creating fluid communication between the two layers, thereby keeping separate the respective materials contained within the respective connecting layers 174.

Figure 17:
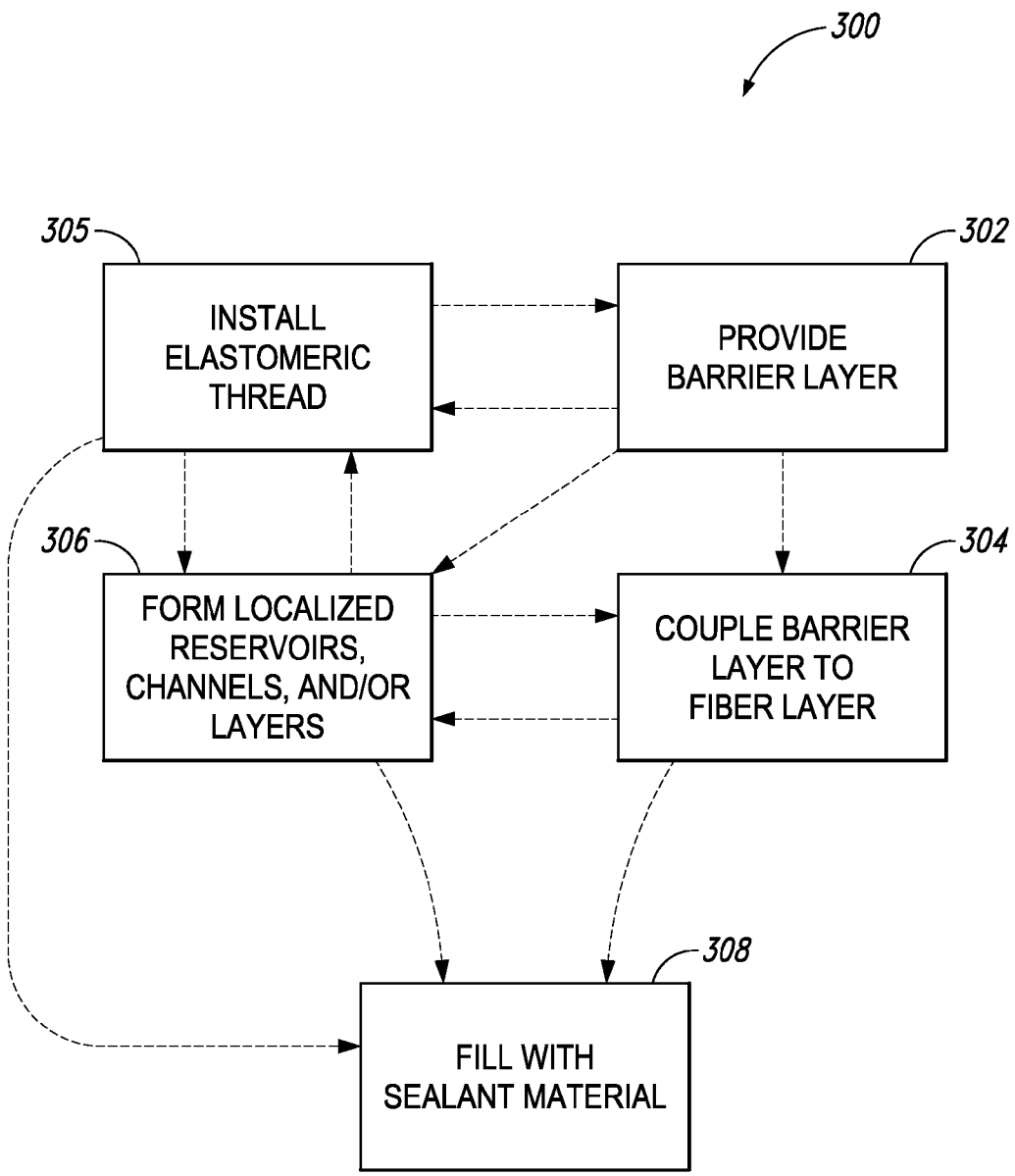
FIG. 17 is a schematic block diagram illustrating methods of fabricating a container having a self-sealing bladder according to the present disclosure.
Figure 18:
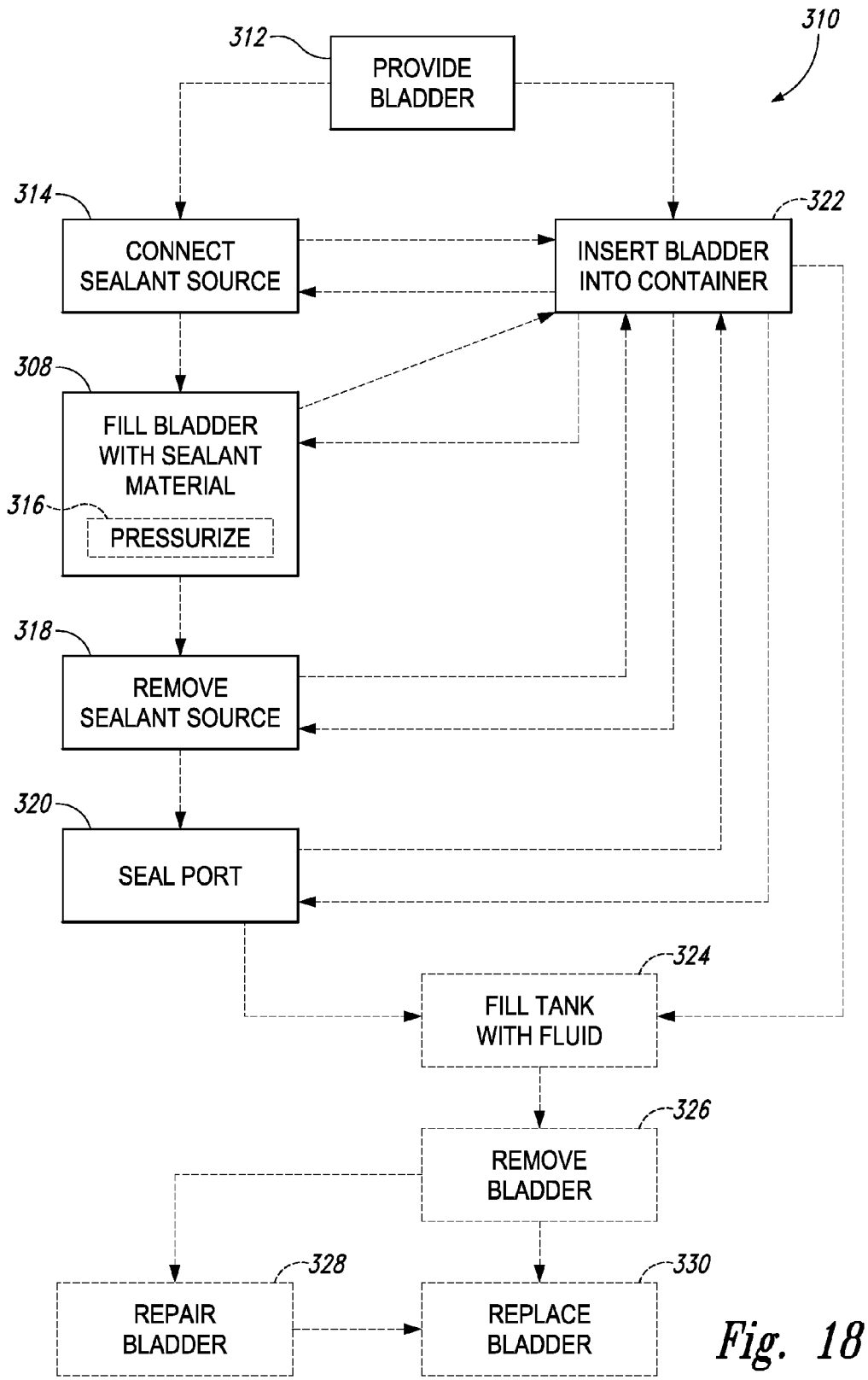
FIG. 18 is a schematic block diagram illustrating methods of filling a self-sealing bladder with sealant, according to the present disclosure.

FIGS. 17-18 schematically provide flowcharts that represent illustrative, non-exclusive examples of methods according to the present disclosure. In FIGS. 17-18, some steps are illustrated in dashed boxes, indicating that such steps may be optional or may correspond to an optional version of a method according to the present disclosure. That said, not all methods according to the present disclosure are required to include the steps illustrated in solid boxes. The methods and steps illustrated in FIGS. 17-18 are not limiting and other methods and steps are within the scope of the present disclosure, including methods having greater than or fewer than the number of steps illustrated, as understood from the discussions herein.

FIG. 17 illustrates methods 300 of fabricating a container (e.g., container 102) configured for holding a fluid (e.g., fluid 120) that may include providing a barrier layer at 302 (e.g., first barrier layer 144 and/or second barrier layer 150) and coupling the barrier layer to a sealant-impermeable layer at 304 (e.g., coupling first barrier layer 144 to first sealant-impermeable layer 146 and/or coupling second barrier layer 150 to second sealant-impermeable layer 148). For example, coupling at 304 may include coupling the first inner surface of the first barrier layer to the first sealant-impermeable layer, and/or coupling the second inner surface of the second barrier layer to the second sealant-impermeable layer. Methods 300 may include installing one or more elastomeric threads at 305 (e.g., elastomeric threads 142) to couple the first sealant-impermeable layer to the second sealant-impermeable layer and define a central bladder area (e.g., central bladder area 160) therebetween. Installing elastomeric thread at 305 may include using a single, continuous elastomeric thread or a plurality of elastomeric threads. As coupled at 305, the first sealant-impermeable layer may be positioned adjacent the second sealant-impermeable layer, and the elastomeric threads may be configured to allow for variable, elastic separation of the second sealant-impermeable layer from the first sealant-impermeable layer, when the elastomeric threads are under tension.

One or more localized reservoirs (e.g., localized reservoirs 164), channels (e.g., channels 166), and/or connecting layers (e.g., connecting layers 174) may be formed within the central bladder area at 306, and one or more of the same may be at least partially filled with sealant material (e.g., sealant material 136) and/or another material (e.g., mobile reactive species 177 or non-mobile reactive species 176) at 308. For example, forming one or more localized reservoirs, channels, and/or connecting layers at 306 may include forming the same using adhesives, thermoplastic welding, and/or placing a formed structure in the central bladder area. In some methods, the central bladder area (e.g., the space between the first sealant-impermeable layer and the second sealant-impermeable layer) may be at least partially filled with the sealant material at 308 such that the sealant material is distributed throughout substantially the entire central bladder area. In some methods 300, filling the central bladder area with sealant material at 308 may include filling a first localized reservoir, channel, and/or connecting layer with a first substance (e.g., sealant material 136) and filling a second localized reservoir, channel, and/or connecting layer with a second substance (e.g., mobile reactive species 177 or non-mobile reactive species 176).

As shown in FIG. 18, methods 310 of using a self-sealing bladder according to the present disclosure may include filling a portion of the central bladder area with a sealant material at 308, along with a number of other steps preceding and/or following filling the central bladder area with a sealant material at 308. For example, a self-sealing bladder according to the present disclosure may be provided at 312, a sealant source (e.g., sealant source 118) may be connected to the central bladder area at 314, such as via a sealant port (e.g., sealant port 138), in order to at least partially fill the central bladder area (or portions thereof) with a sealant material (and/or another material) at 308. In some methods 310, the central bladder area and/or structures formed therein (e.g., channels, localized reservoirs, and/or connecting layers) may be filled at 308 until a point at which the central bladder area is full enough that it is pressurized at 316, such as by filling the central bladder area to a point at which the volume of sealant material is great enough to cause tensioning of the elastomeric threads coupling the sealant-impermeable layers together, thereby creating a pressurized environment within the central bladder area. In other words, once the central bladder area is at least partially filled with sealant material at 308, the elastomeric thread may be at least partially elastically deformed from its resting state (e.g., the non-perforated unfilled configuration of the self-sealing bladder).

Once the central bladder area has been filled with sealant material to the extent desired, the sealant source may be removed, or disconnected, from the self-sealing bladder at 318, and the sealant port may be sealed at 320 in order to retain the sealant material and pressurization of the central bladder area. Before and/or after the central bladder area is at least partially filled with sealant material, the self-sealing bladder may be inserted into a container at 322. In some methods 310, the self-sealing bladder may be inserted into the container at 322 before the central bladder area is at least partially filled with sealant material at 308, which may ease insertion of the self-sealing bladder into the container. Inserting the bladder into the container at 322 may include positioning the self-sealing bladder inside the container such that the first outer surface of the first barrier layer is adjacent the interior surface of the container. As positioned, the second barrier layer may be interior to the first barrier layer, with the second outer surface of the second barrier layer facing the internal space of the container and defining the internal volume of the self-sealing bladder. Inserting the self-sealing bladder into the container at 322 may include coupling the self-sealing bladder to the interior of the container, such as by lacing the bladder into place using thermoplastic cord; however, other techniques are also possible.

Once the self-sealing bladder has been placed inside the container, the interior space of the container and bladder therein may be at least partially filled with a fluid (e.g., fluid 120) at 324. In an example where the container is a fuel tank, the fluid may be fuel, and the interior space of the fuel tank may be at least partially filled with fuel at 324, such that the fuel is inside the container and inside the self-sealing bladder, adjacent the inner fuel barrier layer (e.g., second barrier layer 150) of the self-sealing bladder. Filling the container at 324 may therefore include filling the container such that the bladder wall of the self-sealing bladder is sandwiched between the fluid and the interior surface of the container. In some methods 310, filling the container with fluid at 324 may include coupling a fluid source (e.g., fluid source 134) to a fluid port (e.g., fluid port 132) of the container, flowing the fluid from the fluid source into the container via the fluid port, and closing off the fluid port after filling at least a portion of the internal space of the container with the fluid.

Once filled, the apparatus of which the container is a part, may be used in the normal manner. For example, in a military vehicle application in which the container is a fuel tank, the vehicle may be utilized in combat or other military application. In the event of a perforation being formed in the fuel tank, such as by being hit and punctured by a projectile (e.g., a bullet or other projectile), the self-sealing bladder may be configured to operate as described, and sealant material may flow to the perforation and solidify there in order to seal the wound. In some methods, once a self-sealing bladder has been so perforated, the bladder may be removed from the container at 326. A new self-sealing bladder may be placed within the container in some examples, and/or the self-sealing bladder may be repaired at 328 (e.g., re-filled with sealant material) and replaced back into the container at 330 for further use.

Illustrative, non-exclusive examples of inventive subject matter according to the present disclosure are described in the following enumerated paragraphs:

A1. A self-sealing bladder for use within a container configured for holding a fluid, the self-sealing bladder being configured to be positioned inside the container, between the container and the fluid when the container contains the fluid, the self-sealing bladder being selectively transitionable from a non-perforated unfilled configuration to a non-perforated filled configuration, the self-sealing bladder comprising:

a bladder wall, comprising:

a first sealant-impermeable layer;

a barrier layer comprising an inner surface and an outer surface opposite the inner surface, wherein the barrier layer is substantially impervious to the fluid when the self-sealing bladder is in the non-perforated filled and non-perforated unfilled configurations, wherein the inner surface is arranged to be facing the first sealant-impermeable layer; and a second sealant-impermeable layer coupled to the inner surface of the barrier layer and to the first sealant-impermeable layer; and an elastomeric thread coupling the second sealant-impermeable layer to the first sealant-impermeable layer, the elastomeric thread being configured to couple the second sealant-impermeable layer to the first sealant-impermeable layer such that the elastomeric thread allows for variable, elastic separation of the second sealant-impermeable layer from the first sealant-impermeable layer when the elastomeric thread is under tension, wherein the first sealant-impermeable layer and the second sealant-impermeable layer define a central bladder area formed between the first sealant-impermeable layer and the second sealant-impermeable layer, the central bladder area being configured to receive a sealant material, and wherein the central bladder area has a variable volume depending on the amount of sealant material within the central bladder area.

A1.1 The self-sealing bladder of paragraph A1, wherein the self-sealing bladder has a perforated configuration, and wherein, in the perforated configuration, the self-sealing bladder is configured to, at least partially, automatically seal a perforated portion of the self-sealing bladder, thereby substantially preventing loss of the fluid from the container through the perforated portion.

A1.2. The self-sealing bladder of paragraph A1.1, wherein the bladder wall contains a mobile reactive species and/or a non-mobile reactive species configured to react with the sealant material, thereby automatically sealing the perforated portion of the self-sealing bladder.

A1.3. The self-sealing bladder of any of paragraphs A1-A1.2, wherein the barrier layer is a second barrier layer, the inner surface is a second inner surface, and the outer surface is a second outer surface, the self-sealing bladder further comprising a first barrier layer having a first inner surface and a first outer surface opposite the first inner surface, the first barrier layer being substantially impervious to the fluid when the self-sealing bladder is in the non-perforated filled and non-perforated unfilled configurations, wherein the first sealant-impermeable layer is coupled to the first inner surface of the first barrier layer, wherein the second inner surface of the second barrier layer is arranged to be facing the first inner surface of the first barrier layer, and wherein the first outer surface of the first barrier layer and the second outer surface of the second barrier layer are oriented facing away from one another.

A2. The self-sealing bladder of any of paragraphs A1-A1.3, further comprising a localized reservoir within the central bladder area.

A2.1. The self-sealing bladder of paragraph A2, wherein the localized reservoir comprises a plurality of localized, spaced-apart reservoirs, such as at least one localized reservoir per bladder wall, at least two localized reservoirs per bladder wall, at least three localized reservoirs per bladder wall, at least four localized reservoirs per bladder wall, at least five localized reservoirs per bladder wall, at least two localized reservoirs, at least three localized reservoirs, at least four localized reservoirs, at least five localized reservoirs, at least six localized reservoirs, at least seven localized reservoirs, and/or at least eight localized reservoirs.

A2.2. The self-sealing bladder of paragraph A2.1, wherein the self-sealing bladder comprises a bladder surface area, and wherein the plurality of localized, spaced-apart reservoirs comprises at least one, at least two, at least three, at least four, at least five, and/or at least six localized, spaced-apart reservoirs per square foot of the bladder surface area.

A2.3. The self-sealing bladder of any of paragraphs A2-A2.2, further comprising a channel in fluid communication with the localized reservoir, the channel being positioned within the central bladder area.

A2.4. The self-sealing bladder of paragraph A2.3, wherein the channel comprises a plurality of channels, each channel extending away from the localized reservoir and in fluid communication with the localized reservoir.

A2.5. The self-sealing bladder of paragraph A2.4, wherein the plurality of channels extend radially out from the localized reservoir.

A2.6. The self-sealing bladder of any of paragraphs A2.4-A.2.5, wherein the localized reservoir comprises at least a first localized reservoir and a second localized reservoir spaced apart from the first localized reservoir, wherein the plurality of channels comprises a first plurality of channels and a second plurality of channels, the first plurality of channels being in fluid communication with the first localized reservoir, and the second plurality of channels being in fluid communication with the second localized reservoir.

A2.7. The self-sealing bladder of paragraph A2.6, wherein at least some of the first plurality of channels are positioned between respective adjacent channels of the second plurality of channels.

A2.8. The self-sealing bladder of any of paragraphs A2.6-A2.7, wherein the first plurality of channels are arranged with respect to the second plurality of channels such that an alternating interlocking finger pattern is formed.

A2.9. The self-sealing bladder of any of paragraphs A2-A2.8, further comprising a connecting layer in fluid communication with the localized reservoir, the connecting layer being positioned within the central bladder area.

A2.10. The self-sealing bladder of paragraph A2.9, wherein the connecting layer comprises a plurality of connecting layers, each connecting layer being in fluid communication with the localized reservoir.

A2.11. The self-sealing bladder of any of paragraphs A2.10, wherein the localized reservoir comprises at least a first localized reservoir and a second localized reservoir spaced apart from the first localized reservoir, wherein the plurality of connecting layers comprises a first connecting layer and a second connecting layer, the first connecting layer being in fluid communication with the first localized reservoir, and the second connecting layer being in fluid communication with the second localized reservoir.

A2.12. The self-sealing bladder of paragraph A2.11, wherein the first connecting layer is positioned adjacent the first sealant-impermeable layer of the self-sealing bladder, and wherein the second connecting layer is positioned adjacent the second sealant-impermeable layer of the self-sealing bladder.

A2.13. The self-sealing bladder of any of paragraphs A2-A2.12, wherein one or more of the localized reservoir, a/the channel in fluid communication with the localized reservoir, and a/the connecting layer in fluid communication with the localized reservoir contains a/the mobile reactive species and/or a/the non-mobile reactive species configured to react with the sealant material.

A2.14. The self-sealing bladder of any of paragraphs A2-A2.13, wherein one or more of the localized reservoir, a/the channel in fluid communication with the localized reservoir, and a/the connecting layer in fluid communication with the localized reservoir contains the sealant material.

A2.15. The self-sealing bladder of any of paragraphs A2-A2.14, wherein a/the first localized reservoir contains a first substance, wherein a/the second localized reservoir contains a second substance, and wherein the first substance is different from the second substance.

A2.16. The self-sealing bladder of paragraph A2.10 and any of paragraphs A2.11-A2.15, wherein the plurality of connecting layers are coupled to one another at a plurality of tack locations, wherein the plurality of tack locations do not provide fluid communication between respective connecting layers.

A3. The self-sealing bladder of any of paragraphs A2.1-A2.16, wherein the barrier layer and the second sealant-impermeable layer are configured to form a/the plurality of localized, spaced-apart reservoirs within the central bladder area.

A3.1. The self-sealing bladder of paragraph A3, wherein the plurality of localized, spaced-apart reservoirs are formed integrally with the bladder wall, such that each is defined by an expanded region of the second sealant-impermeable layer being spaced further away from the first sealant-impermeable layer than are adjacent regions of the second sealant-impermeable layer.

A3.2. The self-sealing bladder of paragraph A3, wherein each of the plurality of localized, spaced-apart reservoirs is coupled to the barrier layer and the second sealant-impermeable layer via a respective fitting.

A4. The self-sealing bladder of paragraph A1.3 and any of paragraphs A2.1-A3.2, wherein the first barrier layer and the first sealant-impermeable layer are configured to form a/the plurality of localized, spaced-apart reservoirs within the central bladder area.

A5. The self-sealing bladder of paragraph A4, wherein the plurality of localized, spaced-apart reservoirs are formed integrally with the bladder wall, such that each is defined by expanded regions of the first sealant-impermeable layer being spaced further away from the second sealant-impermeable layer than are adjacent regions of the first sealant-impermeable layer.

A5.1. The self-sealing bladder of paragraph A1.3 and paragraph A4, wherein each of the plurality of localized, spaced-apart reservoirs is coupled to the first barrier layer and the first sealant-impermeable layer via a/the respective fitting.

A6. The self-sealing bladder of any of paragraphs A1-A5.1, wherein the first sealant-impermeable layer is positioned adjacent the second sealant-impermeable layer.

A7. The self-sealing bladder of any of paragraphs A1-A6, further comprising a sealant port configured to allow the sealant material to be inserted within the central bladder area.

A8. The self-sealing bladder of paragraph A1.3 and paragraph A7, wherein the sealant port is coupled to the first barrier layer such that the sealant port provides a passage through the first barrier layer and the first sealant-impermeable layer, such that the sealant material may be passed from a location spaced-apart from the self-sealing bladder to the central bladder area.

A8.1. The self-sealing bladder of paragraph A7 or A8, wherein the sealant port is coupled to the barrier layer such that the sealant port provides a passage through the barrier layer and the second sealant-impermeable layer, such that the sealant material may be passed from a/the location spaced-apart from the self-sealing bladder to the central bladder area.

A9. The self-sealing bladder of any of paragraphs A1-A8.1, further comprising the sealant material, wherein the sealant material at least partially fills the central bladder area between the first sealant-impermeable layer and the second sealant-impermeable layer, thereby placing the self-sealing bladder in the non-perforated filled configuration.

A10. The self-sealing bladder of paragraph A9, wherein the sealant material is distributed throughout substantially the entire central bladder area.

A11. The self-sealing bladder of any of paragraphs A9-A10, wherein the sealant material fills the central bladder area to an extent that the sealant material enters and at least partially fills a/the plurality of localized, spaced-apart reservoirs formed within the central bladder area.

A12. The self-sealing bladder of any of paragraphs A9-A11, wherein the sealant material is insoluble in the fluid the container is configured to hold.

A13. The self-sealing bladder of any of paragraphs A9-A12, wherein the sealant material is insoluble in fuel.

A14. The self-sealing bladder of any of paragraphs A9-A13, wherein the sealant material is insoluble in jet fuel.

A15. The self-sealing bladder of any of paragraphs A9-A14, wherein the sealant material has a viscosity, at 25° C., of greater than 1 cP, greater than 2 cP, greater than 3 cP, greater than 5 cP, greater than 10 cP, greater than 100 cP, greater than 1000 cP, greater than 5000 cP, greater than 10 Pa·s (10,000 cP), greater than 25 Pa·s, greater than 50 Pa·s, greater than 100 Pa·s, greater than 250 Pa·s (250,000 cP), greater than 500 Pa·s, and/or greater than 1,000 Pa·s.

A16. The self-sealing bladder of any of paragraphs A9-A15, wherein the sealant material is reactive with the fluid the container is configured to hold and/or a constituent thereof and/or an additive therein.

A17. The self-sealing bladder of any of paragraphs A9-A15, wherein the sealant material is non-reactive with the fluid the container is configured to hold.

A18. The self-sealing bladder of any of paragraphs A9-A17, wherein the sealant material is reactive with jet fuel.

A19. The self-sealing bladder of any of paragraphs A9-A17, wherein the sealant material is non-reactive with jet fuel.

A20. The self-sealing bladder of any of paragraphs A9-A19, wherein the sealant material has a viscosity at 25° C., of less than 1 cP, less than 2 cP, less than 3 cP, less than 5 cP, less than 10 cP, less than 100 cP, less than 1000 cP, less than 5000 cP, less than 10 Pa·s (10,000 cP), less than 25 Pa·s, less than 50 Pa·s, less than 100 Pa·s, less than 250 Pa·s (250,000 cP), less than 500 Pa·s, and/or less than 1,000 Pa·s.

A21. The self-sealing bladder of any of paragraphs A9-A20, wherein the sealant material comprises a liquid.

A22. The self-sealing bladder of any of paragraphs A9-A21, wherein the sealant material comprises polysulfide.

A23. The self-sealing bladder of any of paragraphs A9-A22, wherein the sealant material is elastomeric.

A24. The self-sealing bladder of any of paragraphs A9-A23, wherein the sealant material is configured to set when it comes into contact with oxygen.

A25. The self-sealing bladder of any of paragraphs A9-A24, wherein the sealant material is configured to set when it comes into contact with air.

A26. The self-sealing bladder of any of paragraphs A9-A25, wherein the sealant material is configured to set when it comes into contact with a predetermined material.

A27. The self-sealing bladder of any of paragraphs A1-A26, wherein the elastomeric thread comprises one continuous elastomeric thread.

A28. The self-sealing bladder of any of paragraphs A1-A26, wherein the elastomeric thread comprises a plurality of elastomeric threads.

A29. The self-sealing bladder of any of paragraphs A1-A28, wherein the elastomeric thread comprises silicone and/or polychloroprene.

A30. The self-sealing bladder of any of paragraphs A1-A29, wherein the elastomeric thread is configured to compress the first sealant-impermeable layer towards the second sealant-impermeable layer.

A31. The self-sealing bladder of any of paragraphs A1-A30, wherein, in the non-perforated filled configuration, the elastomeric thread is configured to pressurize the sealant material contained in the central bladder area.

A31.1. The self-sealing bladder of paragraph A31, wherein the elastomeric thread is configured to pressurize the sealant material contained in the central bladder area such that it has a sealant pressure that is at least 0.5 psi greater than a head pressure of a fluid inside the container.

A32. The self-sealing bladder of paragraph A1.3 and any of paragraphs A1-A31.1, wherein the elastomeric thread is further coupled to the first barrier layer and the second barrier layer.

A33. The self-sealing bladder of paragraph A1.1 and any of paragraphs A2-A32, wherein the elastomeric thread is configured to create a plurality of channels connecting a/the plurality of localized, spaced-apart reservoirs, wherein, in the non-perforated filled configuration and in the perforated configuration, the plurality of channels are configured to allow migration of the sealant material through the central bladder area and between adjacent respective localized, spaced-apart reservoirs, wherein the self-sealing bladder is configured such that, in the perforated configuration, the sealant material migrates towards the perforated portion of the self-sealing bladder in response to a localized reduction in pressure adjacent the perforated portion of the self-sealing bladder.

A34. The self-sealing bladder of any of paragraphs A1-A33, wherein the self-sealing bladder is flexible.

A35. The self-sealing bladder of any of paragraphs A1-A34, wherein the self-sealing bladder is configured to be inserted through a fluid port of the container, the fluid port being configured to allow filling of the container with the fluid.

A36. The self-sealing bladder of any of paragraphs A1-A35, wherein the self-sealing bladder is configured to conform to at least one container wall of the container.

A37. The self-sealing bladder of any of paragraphs A1-A36, wherein the first sealant-impermeable layer and/or the second sealant-impermeable layer comprises one or more of fiberglass, carbon fiber, aramid fiber, polymer fibers, polyamide, polyester, polyethylene terephthalate (PET), polypropylene, polyoxymethylene, polyethylene, polytetrafluoroethylene (PTFE), ultra-high molecular weight polyethylene, and combinations thereof.

A38 The self-sealing bladder of any of paragraphs A1-A37, wherein the first sealant-impermeable layer and/or the second sealant-impermeable layer comprises a woven fabric.

A39. The self-sealing bladder of any of paragraphs A1-A38, wherein the first sealant-impermeable layer and/or the second sealant-impermeable layer comprises a pre-impregnated composite material.

A40. The self-sealing bladder of any of paragraphs A1-A39, wherein the first sealant-impermeable layer and/or the second sealant-impermeable layer comprises a respective plurality of plies coupled together.

A41. The self-sealing bladder of any of paragraphs A1-A40, wherein the barrier layer comprises a fluoroelastomer.

A41.1. The self-sealing bladder of paragraphs A1.3 and any of paragraphs A1-A41, wherein the first barrier layer and/or the second barrier layer comprises a fluoroelastomer.

A42. The self-sealing bladder of any of paragraphs A1-A41.1, wherein the barrier layer comprises a film.

A42.1. The self-sealing bladder of paragraph A1.3 and any of paragraphs A1-A42, wherein the first barrier layer and/or the second barrier layer comprises a film.

A43. The self-sealing bladder of any of paragraphs A1-A42.1, wherein the barrier layer is substantially impervious to a liquid, a gas, a fuel, a hazardous chemical, a nuclear waste product, an oil, a caustic acid, a corrosive gas, a hazardous waste product, a hypergolic fuel, a synthetic fuel, a hydrocarbon fuel, gasoline, diesel, kerosene, a jet fuel, a fuel additive, and/or combinations thereof.

A43.1. The self-sealing bladder of paragraph A1.3 and any of paragraphs A1-A43, wherein the first barrier layer and the second barrier layer are substantially impervious to a liquid, a gas, a fuel, a hazardous chemical, a nuclear waste product, an oil, a caustic acid, a corrosive gas, a hazardous waste product, a hypergolic fuel, a synthetic fuel, a hydrocarbon fuel, gasoline, diesel, kerosene, a jet fuel, a fuel additive, and/or combinations thereof.

A44. The self-sealing bladder of any of paragraphs A1-A43.1, wherein the barrier layer comprises an elastomeric material.

A44.1. The self-sealing bladder of paragraph A1.3 and any of paragraphs A1-A44, wherein the first barrier layer and/or the second barrier layer comprises an elastomeric material.

A45. The self-sealing bladder of paragraph A1.3 and any of paragraphs A1-A44.1, wherein the first barrier layer is adhesively bonded to the first sealant-impermeable layer.

A46. The self-sealing bladder of any of paragraphs A1-A45, wherein the barrier layer is adhesively bonded to the second sealant-impermeable layer.

A47. The self-sealing bladder of paragraph A1.1 and any of paragraphs A2-A46, wherein, in the perforated configuration, the first sealant-impermeable layer and the second sealant-impermeable layer are configured to form a respective scaffold structure of a plurality of fiber ends when the respective sealant-impermeable layer is punctured and/or otherwise perforated at the perforated portion, such that the sealant material contained within the central bladder area is configured to migrate towards the perforated portion in response to a localized reduction in pressure adjacent the perforated portion, wherein the self-sealing bladder is configured such that a portion of the sealant material migrates into the scaffold structure formed at the perforated portion and hardens, thereby at least partially repairing the perforated portion within a sealing time period.

A47.1. The self-sealing bladder of paragraph A47, wherein the sealing time period is less than 4 minutes, less than 2 minutes, less than 1 minute, less than 30 seconds, less than 15 seconds, less than 10 second, less than 5 seconds, less than 3 seconds, and/or less than 1 second long.

A48. The self-sealing bladder of any of paragraphs A1-A47.1, wherein, in the non-perforated unfilled configuration, the bladder wall has an unfilled wall thickness of less than about 2 inches (5 cm), less than about 1.5 inches (3.8 cm), less than about 1 inch (2.5 cm), less than about 0.75 inches (1.9 cm), less than about 0.5 inches (1.27 cm), less than about 0.25 inches (0.64 cm), less than about 0.125 inches (0.32 cm), and/or less than about 0.063 inches (0.16 cm).

A49. The self-sealing bladder of any of paragraphs A1-A48, wherein, the bladder wall, which, in the non-perforated filled configuration, is defined by the barrier layer, the first sealant-impermeable layer, the second sealant-impermeable layer, and the sealant material located in the central bladder area, has an average filled wall thickness of greater than about 2 inches (5 cm), greater than about 1.5 inches (3.8 cm), greater than about 1 inch (2.5 cm), greater than about 0.75 inches (1.9 cm), greater than about 0.5 inches (1.27 cm), greater than about 0.25 inches (0.64 cm), greater than about 0.125 inches (0.32 cm), and/or greater than about 0.063 inches (0.16 cm).

A50. The self-sealing bladder of any of paragraphs A1-A49, wherein a/the plurality of localized, spaced-apart reservoirs of the self-sealing bladder each has a maximum reservoir thickness of greater than about 2 inches (5 cm), greater than about 1.5 inches (3.8 cm), greater than about 1 inch (2.5 cm), greater than about 0.75 inches (1.9 cm), greater than about 0.5 inches (1.27 cm), greater than about 0.25 inches (0.64 cm), greater than about 0.125 inches (0.32 cm), and/or greater than about 0.063 inches (0.16 cm).

A51. The self-sealing bladder of any of paragraphs A1-A50, wherein the self-sealing bladder is a passive self-sealing bladder.

A52. The self-sealing bladder of any of paragraphs A1-A51, wherein the self-sealing bladder is configured to be coupled to the container.

A53. The self-sealing bladder of any of paragraphs A1-A52, further comprising the container, wherein the self-sealing bladder is arranged with respect to the container such that the barrier layer is positioned interiorly to the first sealant-impermeable layer and faces an internal space of the container.

A53.1. The self-sealing bladder of paragraph A1.3 and any of paragraphs A1-A53, wherein the self-sealing bladder is arranged with respect to the container such that the first barrier layer is positioned adjacent an interior surface of the container, and such that the second barrier layer is positioned interiorly to the first barrier layer and faces an internal space of the container.

A54. The self-sealing bladder of any of paragraphs A1-A53, wherein the self-sealing bladder is configured to automatically seal a penetration therethrough of at least 14.5 mm in length.

A55. The self-sealing bladder of any of paragraphs A1-A54, wherein the self-sealing bladder is configured to automatically seal a/the penetration therethrough from a tumbled 0.5 caliber projectile.

A56. The self-sealing bladder of any of paragraphs A1-A55, wherein the self-sealing bladder is configured to automatically seal a/the penetration therethrough in less than 4 minutes, less than 2 minutes, less than 1 minute, less than 30 seconds, less than 15 seconds, less than 10 second, less than 5 seconds, less than 3 seconds, and/or less than 1 second.

A57. The self-sealing bladder of any of paragraphs A1-A56, wherein the container comprises a drum, a storage tank, an aircraft fuel tank, a tank, a military vehicle fuel tank, a tank truck, a rotorcraft fuel tank, a combat vehicle fuel tank, and/or any cavity designed to hold the self-sealing bladder.

A58. The self-sealing bladder of paragraph A1.1 and any of paragraphs A2-A57, wherein, in the perforated configuration, the barrier layer is pervious to the fluid at the perforated portion of the self-sealing bladder.

A58.1. The self-sealing bladder of paragraph A1.3 and any of paragraphs A2-A58, wherein, in the perforated configuration, the first barrier layer and/or the second barrier layer is pervious to the fluid at the perforated portion of the self-sealing bladder.

A59. The self-sealing bladder of paragraph A1.1 and any of paragraphs A2-A58.1, wherein the perforated portion comprises a puncture through at least a portion of the barrier layer, the first sealant-impermeable layer, and/or the second sealant-impermeable layer.

A59.1. The self-sealing bladder of paragraph A1.1, A1.3, and any of paragraphs A2-A59, wherein the perforated portion comprises a puncture through at least a portion of the first barrier layer, the second barrier layer, the first sealant-impermeable layer, and/or the second sealant-impermeable layer.

A60. The self-sealing bladder of paragraph A1.1 and any of paragraphs A2-A59.1, wherein the perforated portion comprises a tear through at least a portion of the barrier layer, the first sealant-impermeable layer, and/or the second sealant-impermeable layer.

A60.1. The self-sealing bladder of paragraph A1.1, A1.3, and any of paragraphs A2-A60, wherein the perforated portion comprises a tear through at least a portion of the first barrier layer, the second barrier layer, the first sealant-impermeable layer, and/or the second sealant-impermeable layer.

A61. The self-sealing bladder of paragraph A1.1 and of paragraph A2.1 and any of paragraphs A2-A60.1, wherein, in the perforated configuration, the sealant material contained within the localized, spaced-apart reservoirs in the non-perforated filled configuration is automatically at least partially squeezed out of and away from one or more of the localized, spaced-apart reservoirs and towards the perforated portion of the self-sealing bladder.

A62. The self-sealing bladder of paragraph A1.1 and any of paragraphs A2-A61, wherein the sealant material contained within the central bladder area in the non-perforated filled configuration is configured to seal the perforated portion of the self-sealing bladder when the self-sealing bladder is induced to the perforated configuration.

B1. A container configured for holding a fluid, the container comprising:

a plurality of container walls defining an internal space having a volume sufficient to hold the fluid, each of the container walls having an exterior wall surface and an interior wall surface, the interior wall surfaces collectively forming an interior surface of the container; and a fluid port configured to allow fluid to be flowed into the internal space of the container, the container being configured to receive the self-sealing bladder of any of paragraphs A1-A62 via the fluid port.

B2. The container of paragraph B1, wherein the container comprises one or more of a drum, a storage tank, an aircraft fuel tank, a tank, a military vehicle fuel tank, a tank truck, a rotorcraft fuel tank, a cavity designed to hold the self-sealing bladder, and a combat vehicle fuel tank.

B3. The container of any of paragraphs B1-B2, wherein the fluid the container is configured to hold comprises one or more of a liquid, a gas, a fuel, a hazardous chemical, a nuclear waste product, an oil, a caustic acid, a corrosive gas, a hazardous waste product, a hypergolic fuel, a synthetic fuel, a hydrocarbon fuel, gasoline, diesel, kerosene, a jet fuel, a fuel additive, and combinations thereof.

B4. The container of any of paragraphs B1-B3, wherein one or more of the plurality of container walls contains a/the mobile reactive species and/or a/the non-mobile reactive species configured to react with the sealant material.

C1. A system, comprising:

the self-sealing bladder of any of paragraphs A1-A62;

the container of any of paragraphs B1-B4; and a sealant source comprising a volume of sealant material sufficient to fill at least a portion of the central bladder area of the self-sealing bladder.

C2. The system of paragraph C1, wherein the self-sealing bladder is positioned within the container.

C2.1. The system of any of paragraphs C1 and C2, wherein the self-sealing bladder comprises the self-sealing bladder of paragraph A1.3 and any of paragraphs A1-A62, and wherein the self-sealing bladder is positioned with respect to the container such that the first outer surface of the first barrier layer is positioned adjacent the interior surface of the container.

C3. The system of any of paragraphs C1-C2.1, further comprising the fluid, wherein the fluid fills at least a portion of the internal space of the container, inside the self-sealing bladder.

C3.1. The system of paragraph C3, wherein the fluid is adjacent the barrier layer of the self-sealing bladder.

C3.2. The system of any of paragraphs C3-C3.1, wherein the fluid is adjacent the outer surface of the barrier layer, such that the fluid is contained within the self-sealing bladder, such that the bladder wall of the self-sealing bladder is sandwiched between the interior surface of the container and the fluid.

C4. The system of any of paragraphs C3-C3.2, wherein the fluid comprises a liquid, a gas, a fuel, a hazardous chemical, a nuclear waste product, an oil, a caustic acid, a corrosive gas, a hazardous waste product, a hypergolic fuel, a synthetic fuel, a hydrocarbon fuel, gasoline, diesel, kerosene, a jet fuel, a fuel additive, and/or combinations thereof.

C5. The system of any of paragraphs C1-C4, further comprising a fluid source coupled to the fluid port of the container, the fluid source being configured to fill at least a portion of the internal space of the container with the fluid via the fluid port.

D1. An apparatus comprising the self-sealing bladder of any of paragraphs A1-A62, the container of any of paragraphs B1-B3, and/or the system of any of paragraphs C1-05.

D2. The apparatus of paragraph D1, wherein the apparatus comprises a watercraft, a land vehicle, a spacecraft, an automobile, a military vehicle, a combat aircraft, a rotorcraft, a jet fighter, a military aircraft, a military patrol vehicle, an armored limousine, a motorsport vehicle, a space vehicle, a space structure, a military armor, a boat, and/or a performance vehicle.

E1. A method of fabricating a container configured for holding a fluid, the container comprising an internal space configured to receive the fluid therein, the method comprising:

providing a first sealant-impermeable layer;

coupling a barrier layer to a second sealant-impermeable layer, the barrier layer comprising an inner surface and an outer surface opposite the inner surface, wherein the barrier layer is substantially impervious to the fluid;

coupling the first sealant-impermeable layer to the second sealant-impermeable layer using elastomeric thread, thereby forming a central bladder area defined between the first sealant-impermeable layer and the second sealant-impermeable layer, wherein the first sealant-impermeable layer, the second sealant-impermeable layer, and the barrier layer together form a bladder wall of a self-sealing bladder, wherein the self-sealing bladder is configured to contain the fluid inside the bladder wall, adjacent the outer surface of the barrier layer;

positioning the self-sealing bladder inside the container such that the barrier layer is interior to the second sealant-impermeable layer, with the outer surface of the barrier layer facing the internal space of the container; and inserting a sealant material into the central bladder area between the first sealant-impermeable layer and the second sealant-impermeable layer, such that the sealant material is distributed throughout substantially the entire central bladder area, wherein the central bladder area contains a plurality of localized, spaced-apart reservoirs.

E1.1 The method of paragraph E1, wherein the barrier layer and the second sealant-impermeable layer are configured to form the plurality of localized, spaced-apart reservoirs.

E1.2. The method of any of paragraphs E1-E1.1, wherein the inserting the sealant material into the central bladder area causes the sealant material to enter and substantially fill the plurality of localized, spaced-apart reservoirs.

E2. The method of any of paragraphs E1-E1.2, wherein the coupling the first sealant-impermeable layer to the second sealant-impermeable layer comprises coupling the first sealant-impermeable layer to the second sealant-impermeable layer such that the first sealant-impermeable layer is positioned adjacent the second sealant-impermeable layer.

E3. The method of any of paragraphs E1-E2, wherein the coupling the first sealant-impermeable layer to the second sealant-impermeable layer comprises coupling the first sealant-impermeable layer to the second sealant-impermeable layer such that the elastomeric thread allows for variable, elastic separation of the second sealant-impermeable layer from the first sealant-impermeable layer when the elastomeric thread is under tension.

E4. Intentionally blank.

E5. The method of any of paragraphs E1-E3, wherein the coupling the barrier layer to the second sealant-impermeable layer comprises coupling the inner surface of the barrier layer to the second sealant-impermeable layer.

E6. The method of any of paragraphs E1-E5, wherein the inserting the sealant material is performed after the positioning the self-sealing bladder inside the container.

E7. The method of any of paragraphs E1-E6, further comprising filling at least a portion of the internal space of the container with the fluid, such that the fluid is contained by the self-sealing bladder, adjacent the barrier layer of the self-sealing bladder, wherein the bladder wall is sandwiched between the fluid and the interior surface of the container.

E8. The method of paragraph E7, wherein the filling at least a portion of the internal space of the container with the fluid comprises coupling a fluid source to a fluid port of the container and flowing the fluid from the fluid source into the container via the fluid port, the method further comprising closing off the fluid port after the filling at least a portion of the internal space of the container with the fluid.

E9. The method of any of paragraphs E1-E8, wherein the fluid comprises one or more of a liquid, a gas, a fuel, a hazardous chemical, a nuclear waste product, an oil, a caustic acid, a corrosive gas, a hazardous waste product, a hypergolic fuel, a synthetic fuel, a hydrocarbon fuel, gasoline, diesel, kerosene, a jet fuel, a fuel additive, and combinations thereof.

E10. The method of any of paragraphs E1-E9, wherein the container comprises one or more of a drum, a storage tank, an aircraft fuel tank, a tank, a military vehicle fuel tank, a tank truck, a rotorcraft fuel tank, and a combat vehicle fuel tank.

E11. The method of any of paragraphs E1-E10, wherein the self-sealing bladder is a flexible self-sealing bladder.

E12. The method of any of paragraphs E1-E11, wherein the coupling the first sealant-impermeable layer to the second sealant-impermeable layer using elastomeric thread comprises coupling the first sealant-impermeable layer to the second sealant-impermeable layer using a single, continuous piece of elastomeric thread.

E13. The method of any of paragraphs E1-E11, wherein the coupling the first sealant-impermeable layer to the second sealant-impermeable layer using elastomeric thread comprises coupling the first sealant-impermeable layer to the second sealant-impermeable layer using a plurality of pieces of elastomeric thread.

E14. The method of any of paragraphs E1-E13, wherein the positioning the self-sealing bladder inside the container comprises coupling the self-sealing bladder to the container by lacing the self-sealing bladder into place using a thermoplastic cord.

E15. The method of any of paragraphs E1-E14, further comprising removing the self-sealing bladder from the container after the self-sealing bladder is perforated at a perforated portion.

E16. The method of paragraph E15, further comprising repairing the perforated portion of the self-sealing bladder.

E17. The method of paragraph E16, further comprising replacing the self-sealing bladder back into the container after the repairing the perforated portion of the self-sealing bladder.

E18. The method of any of paragraphs E1-E17, further comprising forming one or more channels within the central bladder area.

E18.1. The method of paragraph E18, wherein the forming the one or more channels within the central bladder area comprises forming the one or more channels to be in fluid communication with one or more respective localized spaced-apart reservoirs of the plurality of localized, spaced-apart reservoirs.

E18.2. The method of any of paragraphs E18-E18.1, wherein the forming one or more channels with the central bladder area comprises forming a first channel and a second channel.

E18.3. The method of paragraph E18.2, wherein the first channel is in fluid communication with a first localized reservoir.

E18.4. The method of any of paragraphs E18.2-E18.3, further comprising filling the first channel with a first substance and filling the second channel with a second substance, the first substance being different from the second substance.

E18.5. The method of paragraph E18.4, wherein the first substance comprises the sealant material.

E18.6. The method of any of paragraphs E18.4-E18.5, wherein the second substance comprises a non-mobile-reactive species.

E18.7. The method of any of paragraphs E18.4-E18.5, wherein the second substance comprises a mobile-reactive species.

E19. The method of any of paragraphs E18-E18.7, wherein the forming the one or more channels within the central bladder area comprises one or more of applying an adhesive material, thermoplastic welding, stitching, and placing a formed material in the central bladder area.

E20. The method of any of paragraphs E1-E19, wherein the plurality of localized, spaced-apart reservoirs comprises a first reservoir and a second reservoir, the method further comprising filling at least a portion of the first reservoir with a first substance, and filling at least a portion of the second reservoir with a second substance, the first substance being different from the second substance.

E21. The method of paragraph E20, wherein the first substance comprises the sealant material and wherein the second substance comprises a mobile reactive species. E22. The method of any of paragraphs E1-E21, wherein the barrier layer is a second barrier layer, the inner surface of the barrier layer is a second inner surface of the second barrier layer, and the outer surface is a second outer surface of the second barrier layer, the method further comprising: coupling a first barrier layer to the first sealant-impermeable layer, the first barrier layer having a first inner surface and a first outer surface opposite the first inner surface, wherein the first barrier layer is substantially impervious to the fluid, wherein the first inner surface and the second inner surface are oriented facing towards one another, wherein the first outer surface and the second outer surface are oriented facing away from one another, and wherein the bladder wall includes the first barrier layer; and wherein the positioning the self-sealing bladder inside the container comprises positioning the self-sealing bladder such that the first outer surface of the first barrier layer is adjacent an interior surface of the container and the second barrier layer is interior to the first barrier layer, with the second outer surface of the second barrier layer facing the internal space of the container.

E23. The method of any of paragraphs E1-E3, further comprising coupling the first inner surface of the first barrier layer to the first sealant-impermeable layer.

F1. A method of filling a self-sealing bladder, the method comprising:

providing the self-sealing bladder according to any of paragraphs A1-A62;

coupling the self-sealing bladder to a sealant source via a sealant port;

inserting a sealant material from the sealant source into the central bladder area of the self-sealing bladder;

removing the sealant source from the sealing port of the self-sealing bladder; and closing off the sealant port such that the sealant material is retained within the central bladder area of the self-sealing bladder.

F2. The method of paragraph F1, further comprising inserting the self-sealing bladder into a container configured to contain a fluid.

F2.1. The method of paragraph F2, further comprising removing the self-sealing bladder from the container after the self-sealing bladder is perforated at a perforated portion.

F2.2. The method of paragraph F2.1, further comprising repairing the perforated portion of the self-sealing bladder.

F2.3. The method of paragraph F2.2, further comprising replacing the self-sealing bladder back into the container after the repairing the perforated portion of the self-sealing bladder.

F3. The method of any of paragraphs F2-F2.3, wherein the inserting the self-sealing bladder into the container is performed before the inserting sealant material from the sealant source into the central bladder area.

F4. The method of any of paragraphs F2-F2.3, wherein the inserting the self-sealing bladder into the container is performed after the inserting sealant material from the sealant source into the central bladder area.

F5. The method of any of paragraphs F1-F4, wherein the inserting sealant material from the sealant source into the central bladder area comprises inserting sealant material such that the sealant material is pressurized within the central bladder area.

F6. The method of any of paragraphs F1-F5, wherein the inserting sealant material from the sealant source into the central bladder area comprises inserting sealant material such that the elastomeric thread is at least partially elastically deformed from a resting state.

G1. Use of the self-sealing bladder of any of paragraphs A1-A62 to minimize loss of a fluid within a container in the event of a perforation being formed in the container.

H1. Use of the container of any of paragraphs B1-B4 to minimize loss of a fluid within the container in the event of a perforation being formed in the container.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and steps of methods disclosed herein are not required to all apparatuses and methods according to the present disclosure, and the scope of the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A self-sealing bladder for use within a container configured for holding a fluid, the self-sealing bladder being configured to be positioned inside the container, between the container and the fluid when the container contains the fluid, the self-sealing bladder having a non-perforated filled configuration, a non-perforated unfilled configuration, and a perforated configuration, the self-sealing bladder comprising:

a bladder wall, comprising:
    a first sealant-impermeable layer;
    a barrier layer comprising an inner surface and an outer surface opposite the inner surface, wherein the barrier layer is substantially impervious to the fluid when the self-sealing bladder is in the non-perforated filled and non-perforated unfilled configurations, wherein the inner surface is arranged to be facing the first sealant-impermeable layer; and
    a second sealant-impermeable layer coupled to the inner surface of the barrier layer and to the first sealant-impermeable layer, wherein the first sealant-impermeable layer and the second sealant-impermeable layer define a central bladder area formed between the first sealant-impermeable layer and the second sealant-impermeable layer, the central bladder area being configured to receive a sealant material, wherein the central bladder area has a variable volume depending on the amount of sealant material within the central bladder area;

a localized reservoir within the central bladder area; and an elastomeric thread coupling the second sealant-impermeable layer to the first sealant-impermeable layer, the elastomeric thread being configured to couple the second sealant-impermeable layer to the first sealant-impermeable layer such that the elastomeric thread allows for variable, elastic separation of the second sealant-impermeable layer from the first sealant-impermeable layer when the elastomeric thread is under tension, and wherein, in the perforated configuration, the self-sealing bladder is configured to, at least partially, automatically seal a perforated portion of the self-sealing bladder, thereby substantially preventing loss of the fluid from the container through the perforated portion.

2. The self-sealing bladder according to claim 1, wherein the localized reservoir comprises a plurality of localized, spaced-apart reservoirs.

3. The self-sealing bladder according to claim 1, further comprising a channel in fluid communication with the localized reservoir, the channel being positioned within the central bladder area.

4. The self-sealing bladder according to claim 3, wherein the channel comprises a plurality of channels, each channel extending away from the localized reservoir and in fluid communication with the localized reservoir.

5. The self-sealing bladder according to claim 4, wherein the plurality of channels extend radially out from the localized reservoir.

6. The self-sealing bladder according to claim 4, wherein the localized reservoir comprises at least a first localized reservoir and a second localized reservoir spaced apart from the first localized reservoir, wherein the plurality of channels comprises a first plurality of channels and a second plurality of channels, the first plurality of channels being in fluid communication with the first localized reservoir, and the second plurality of channels being in fluid communication with the second localized reservoir.

7. The self-sealing bladder according to claim 1, further comprising a connecting layer in fluid communication with the localized reservoir, the connecting layer being positioned within the central bladder area.

8. The self-sealing bladder according to claim 7, wherein the localized reservoir comprises at least a first localized reservoir and a second localized reservoir spaced apart from the first localized reservoir, wherein the connecting layer comprises a first connecting layer and a second connecting layer, the first connecting layer being in fluid communication with the first localized reservoir, and the second connecting layer being in fluid communication with the second localized reservoir.

9. The self-sealing bladder according to claim 8, wherein the first localized reservoir and the first connecting layer contain the sealant material, and wherein the second localized reservoir and the second connecting layer contain a mobile reactive species configured to react with the sealant material.

10. The self-sealing bladder according to claim 1, further comprising the sealant material, wherein the sealant material at least partially fills the central bladder area between the first sealant-impermeable layer and the second sealant-impermeable layer, thereby placing the self-sealing bladder in the non-perforated filled configuration.

11. The self-sealing bladder according to claim 10, wherein the sealant material is configured to solidify when it comes into contact with air.

12. The self-sealing bladder according to claim 10, wherein, in the non-perforated filled configuration, the elastomeric thread is configured to pressurize the sealant material contained in the central bladder area by compressing the first sealant-impermeable layer towards the second sealant-impermeable layer.

13. The self-sealing bladder according to claim 10, wherein, in the perforated configuration, the sealant material contained within the localized, spaced-apart reservoirs in the non-perforated filled configuration is automatically at least partially squeezed out of and away from one or more of the localized, spaced-apart reservoirs and towards the perforated portion of the self-sealing bladder, and wherein the sealant material contained within the central bladder area in the non-perforated filled configuration is configured to seal the perforated portion of the self-sealing bladder when the self-sealing bladder is induced to the perforated configuration.

14. The self-sealing bladder according to claim 1, further comprising the container, wherein the container comprises one or more of a drum, a storage tank, an aircraft fuel tank, a tank, a military vehicle fuel tank, a tank truck, a rotorcraft fuel tank, a combat vehicle fuel tank, and any cavity designed to hold the self-sealing bladder.

15. A method of fabricating a container configured for holding a fluid, the container comprising an internal space configured to receive the fluid therein, the method comprising:
providing a first sealant-impermeable layer;
coupling a barrier layer to a second sealant-impermeable layer, the barrier layer comprising an inner surface and an outer surface opposite the inner surface, wherein the barrier layer is substantially impervious to the fluid;
coupling the first sealant-impermeable layer to the second sealant-impermeable layer using elastomeric thread, thereby forming a central bladder area defined between the first sealant-impermeable layer and the second sealant-impermeable layer, wherein the first sealant-impermeable layer, the second sealant-impermeable layer, and the barrier layer together form a bladder wall of a self-sealing bladder, wherein the self-sealing bladder is configured to contain the fluid inside the bladder wall, adjacent the outer surface of the barrier layer;
forming a plurality of localized, spaced-apart reservoirs within the central bladder area;
positioning the self-sealing bladder inside the container such that the barrier layer is interior to the second sealant-impermeable layer, with the outer surface of the barrier layer facing the internal space of the container; and
inserting a sealant material into the central bladder area between the first sealant-impermeable layer and the second sealant-impermeable layer, such that the sealant material is distributed throughout substantially the entire central bladder area.

16. The method according to claim 15, wherein the coupling the first sealant-impermeable layer to the second sealant-impermeable layer comprises coupling the first sealant-impermeable layer to the second sealant-impermeable layer such that the elastomeric thread allows for variable, elastic separation of the second sealant-impermeable layer from the first sealant-impermeable layer when the elastomeric thread is under tension.

17. The method according to claim 15, further comprising filling at least a portion of the internal space of the container with the fluid, such that the fluid is contained by the self-sealing bladder, adjacent the barrier layer of the self-sealing bladder, wherein the bladder wall is sandwiched between the fluid and an interior surface of the container.

18. The method according to claim 15, further comprising forming one or more channels within the central bladder area, the one or more channels each being in fluid communication with one or more respective localized spaced-apart reservoirs of the plurality of localized, spaced-apart reservoirs.

19. The method according to claim 15, wherein the plurality of localized, spaced-apart reservoirs comprises a first reservoir and a second reservoir, the method further comprising filling at least a portion of the first reservoir with a first substance, and filling at least a portion of the second reservoir with a second substance, the first substance being different from the second substance.

20. The method according to claim 15, further comprising removing the self-sealing bladder from the container after the self-sealing bladder is perforated at a perforated portion, repairing the perforated portion of the self-sealing bladder, re-filling the central bladder area with sealant material, and replacing the self-sealing bladder back into the container after the repairing the perforated portion of the self-sealing bladder.

\* \* \* \* \*